US010879952B2

(12) United States Patent
Hu et al.

(10) Patent No.: US 10,879,952 B2
(45) Date of Patent: Dec. 29, 2020

(54) APPARATUS AND RECEIVER FOR PERFORMING SYNCHRONIZATION IN ANALOG SPREAD SPECTRUM SYSTEMS

(71) Applicants: Lan Hu, Ottawa (CA); Xinyu Xu, Ottawa (CA)

(72) Inventors: Lan Hu, Ottawa (CA); Xinyu Xu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 15/956,338

(22) Filed: Apr. 18, 2018

(65) Prior Publication Data

US 2019/0326948 A1    Oct. 24, 2019

(51) Int. Cl.
*H04B 1/7073* (2011.01)
*H04J 13/00* (2011.01)

(52) U.S. Cl.
CPC ...... *H04B 1/70735* (2013.01); *H04J 13/0022* (2013.01); *H04J 13/0074* (2013.01)

(58) Field of Classification Search
None
See application file for complete search history.

(56) References Cited

U.S. PATENT DOCUMENTS

| | | | | |
|---|---|---|---|---|
| 5,838,669 A * | 11/1998 | Gerakoulis | ............ | H04B 7/216 370/320 |
| 6,377,614 B1 * | 4/2002 | Yamashita | ........... | H04B 1/7073 375/148 |
| 6,493,376 B1 * | 12/2002 | Harms | ................... | H04B 1/707 375/130 |
| 6,735,242 B1 * | 5/2004 | Kenney | ............... | H04B 1/7085 370/515 |
| 6,741,578 B1 * | 5/2004 | Moon | .................. | H04B 1/7083 370/335 |
| 6,963,602 B1 * | 11/2005 | Borowski | ................ | H03J 7/04 375/142 |

(Continued)

FOREIGN PATENT DOCUMENTS

| | | |
|---|---|---|
| CN | 1267978 A | 9/2000 |
| CN | 104954042 A | 9/2015 |
| EP | 0951148 A2 | 10/1999 |

*Primary Examiner* — Gregory B Sefcheck
*Assistant Examiner* — Suk Jin Kang

(57) ABSTRACT

Apparatuses and methods for decoding a spreading code-encoded signal. The decoder decodes a spreading code-encoded signal by performing a synchronization search to determine a synchronization point. The synchronization point defines a time delay for aligning a spreading code, which was used to generate the spreading code-encoded signal, with the spreading code-encoded signal. The synchronization search includes obtaining candidate results, where each candidate result is a decoding attempt that applies a time delay for aligning the spreading code with the spreading code-encoded signal. The synchronization search also includes determining the synchronization point by identifying the time delay corresponding to the candidate result that is associated with a power measurement that satisfies a synchronization search criterion. A decoder code synchronization is performed to align the spreading code with the spreading code-encoded signal, using the synchronization point. The spreading code-encoded signal is decoded using the aligned spreading code.

20 Claims, 20 Drawing Sheets

(56) References Cited

U.S. PATENT DOCUMENTS

| | | | | |
|---|---|---|---|---|
| RE42,827 E | * | 10/2011 | Moon | H04B 1/7083 370/335 |
| 8,976,842 B1 | * | 3/2015 | Peng | H04B 1/709 375/135 |
| 2002/0009129 A1 | * | 1/2002 | Choi | H04B 1/707 375/149 |
| 2002/0034215 A1 | * | 3/2002 | Inoue | H04B 1/7117 375/147 |
| 2002/0160744 A1 | * | 10/2002 | Choi | H04B 7/2628 455/403 |
| 2003/0133429 A1 | * | 7/2003 | Choi | H04B 7/2684 370/342 |
| 2003/0219082 A1 | * | 11/2003 | Tanaka | H03J 1/005 375/324 |
| 2004/0013175 A1 | * | 1/2004 | Tanaka | G01S 19/30 375/149 |
| 2004/0042534 A1 | * | 3/2004 | Raphaeli | H04B 1/7075 375/150 |
| 2004/0156426 A1 | * | 8/2004 | Motoyoshi | H04B 1/7075 375/150 |
| 2004/0202229 A1 | * | 10/2004 | Raphaeli | H04B 1/7075 375/145 |
| 2005/0083996 A1 | * | 4/2005 | Robinson | H04B 1/707 375/131 |
| 2005/0168382 A1 | * | 8/2005 | Awata | G01S 19/29 342/357.68 |
| 2005/0180362 A1 | * | 8/2005 | Chin | H04W 74/0833 370/335 |
| 2005/0272460 A1 | * | 12/2005 | Imai | H04B 1/1027 455/522 |
| 2007/0160169 A1 | * | 7/2007 | Tanaka | H03J 1/005 375/326 |
| 2007/0263705 A1 | * | 11/2007 | Tanaka | G01S 19/30 375/149 |
| 2008/0025283 A1 | * | 1/2008 | Chin | H04W 74/0833 370/342 |
| 2008/0025440 A1 | * | 1/2008 | Sanada | H04B 1/70757 375/340 |
| 2008/0219328 A1 | * | 9/2008 | Sanada | H04B 1/70757 375/148 |
| 2009/0207892 A1 | * | 8/2009 | Sanji | H04B 1/7075 375/150 |
| 2009/0258657 A1 | * | 10/2009 | Tanaka | H03J 1/005 455/456.1 |
| 2009/0323772 A1 | * | 12/2009 | Sanji | H04B 1/7077 375/141 |
| 2010/0014562 A1 | * | 1/2010 | Tanaka | G01S 7/4802 375/130 |
| 2010/0157950 A1 | * | 6/2010 | Ozluturk | G06F 13/374 370/335 |
| 2010/0232478 A1 | * | 9/2010 | Sanji | H04B 1/7073 375/150 |
| 2011/0007781 A1 | * | 1/2011 | Camp, Jr. | H04B 1/70718 375/141 |
| 2011/0158202 A1 | * | 6/2011 | Ozukturk | H04N 1/00912 370/335 |
| 2014/0044009 A1 | * | 2/2014 | Piesinger | H04W 56/001 370/254 |
| 2017/0185049 A1 | * | 6/2017 | Matsue | G01S 19/30 |
| 2017/0367060 A1 | * | 12/2017 | Reinhardt | H03M 1/001 |
| 2018/0054294 A1 | * | 2/2018 | Rappaport | H04B 17/104 |

* cited by examiner

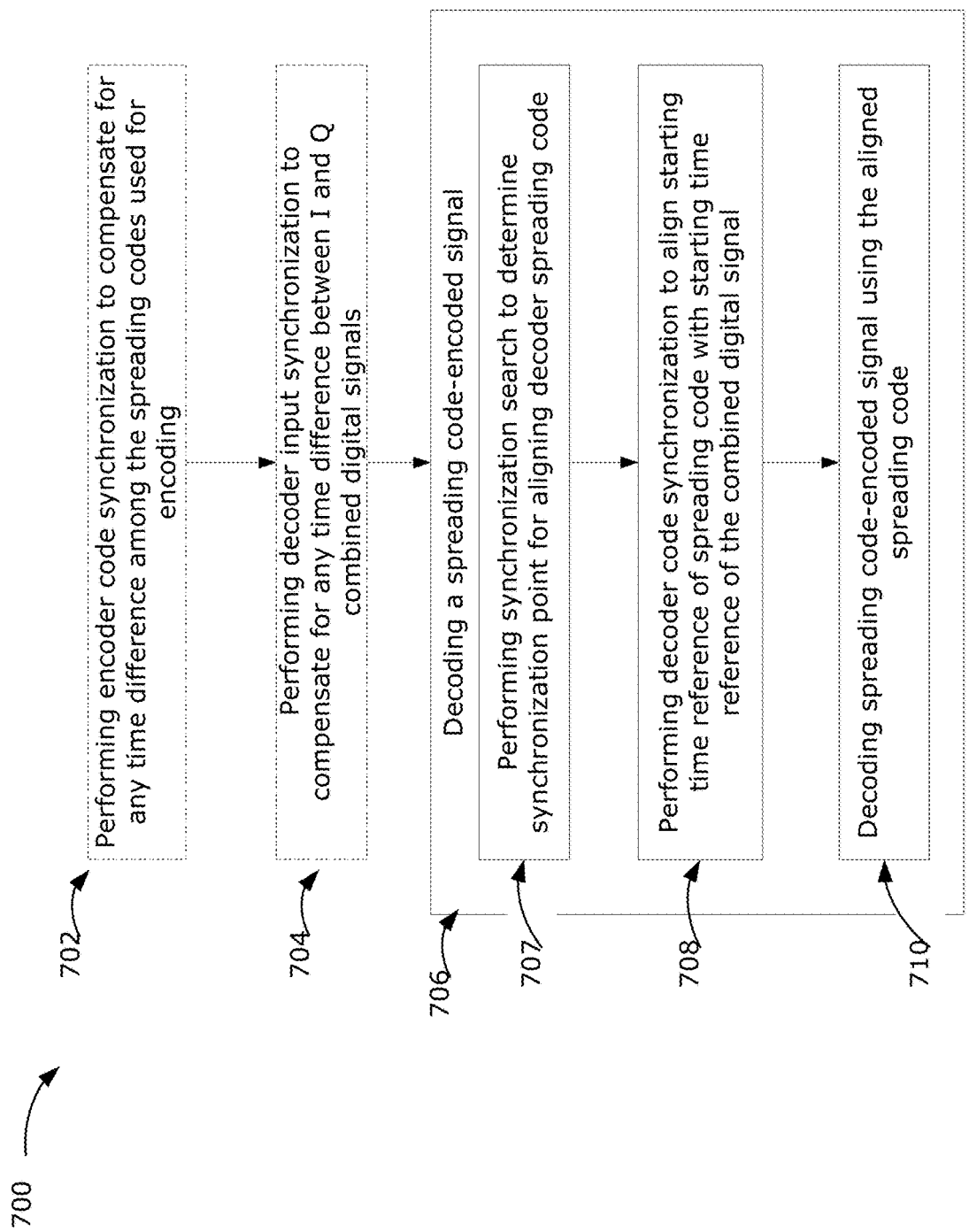

APPARATUS AND RECEIVER FOR PERFORMING SYNCHRONIZATION IN ANALOG SPREAD SPECTRUM SYSTEMS

TECHNICAL FIELD

The present disclosure relates to an apparatus for performing synchronization in an analog spread spectrum system. Embodiments of the present disclosure relate to a receiver.

BACKGROUND

A communication device, which may be used for wired and/or wireless communications, may be a base station or other electronic device. Such a communication device may have a transceiver that receives and transmits signals over different frequency bands. The transceiver may be implemented as a receiver and a transmitter. Various communication devices in a communication network may receive analog signals over multiple receiving paths.

In an analog spread spectrum communication system, an RF analog signal is transmitted on a bandwidth considerably larger than the frequency content of the original information. A spreading code is used to spread the signal over the frequency domain. Transmission of a signal that is spread in the frequency domain may help to establish secure communications with increased resistance to natural interference, noise and/or jamming. A spread spectrum signal is received and processed by a spread spectrum receiver in a communication device.

A typical spread spectrum receiver may be designed to process signals in accordance with any suitable protocol and standard, such as code division multiple access (CDMA). In order for the receiver to despread and recover data from a received signal, it is necessary for the receiver to synchronize the spreading code.

However, conventional synchronization techniques are typically only implemented in a digital domain and are concerned with digital signals. For example, cross-correlation algorithms may be used in CDMA. Such conventional approaches may not be suitable for processing spread spectrum analog signals. Accordingly, it would be desirable to provide a solution for accurate and efficient synchronization when a spread spectrum analog signal is received, to ensure that the received spread spectrum analog signal is properly processed at the receiver.

SUMMARY

In some examples, the present disclosure describes an apparatus and a receiver that performs synchronization for decoding spread spectrum analog signals. The receiver is able to output a plurality of decoded digital signals accurately corresponding to the received RF analog signals. A synchronization search is performed to determine a synchronization point, for synchronizing a spreading code for decoding.

In some aspects, the present disclosure describes an apparatus for decoding a spreading code-encoded signal. The apparatus includes a decoder configured to receive a spreading code-encoded signal. The decoder is further configured to decode the received spreading code-encoded signal by performing a synchronization search to determine a synchronization point, the synchronization point defining at least a time delay for aligning a starting time reference of a spreading code, which was used to generate the received spreading code-encoded signal, with a starting time reference of the received spreading code-encoded signal. The synchronization search is performed by: obtaining a plurality of candidate results, each candidate result being a decoding attempt that applies at least a respective time delay for aligning the spreading code with the received spreading code-encoded signal; and determining the synchronization point by identifying at least the time delay corresponding to the candidate result that is associated with a power measurement that satisfies a synchronization search criterion. The decoder is further configured to decode the received spreading code-encoded signal by performing a decoder code synchronization to align the starting time reference of the spreading code with the starting time reference of the received spreading code-encoded signal, using the synchronization point. The decoder is further configured to decode the received spreading code-encoded signal by decoding the received spreading code-encoded signal using the aligned spreading code.

In any of the preceding aspects/embodiments, the received spreading code-encoded signal may be received in a combined signal combining a plurality of spreading code-encoded signals. The apparatus may further include: a plurality of spreading code-encoders, each spreading code-encoder being configured to encode a respective analog signal using a respective spreading code and to output a respective spreading code-encoded signal; and a spreading code source configured to provide the respective spreading codes to the plurality of spreading code-encoders via respective code transmitting paths, the spreading code source being further configured to perform an encoder code synchronization to compensate for any time difference among the spreading codes caused by path delays among the code transmitting paths.

In any of the preceding aspects/embodiments, the spreading code source may be further configured to perform the encoder code synchronization by: performing a time delay adjustment to reduce any time difference among the spreading codes; and performing a code phase adjustment to align phases of the spreading codes with respect to each other.

In any of the preceding aspects/embodiments, the received spreading code-encoded signal may be received in a combined signal combining a plurality of spreading code-encoded signals. The decoder may be further configured to: perform a first decoding, including performing the synchronization search to determine the synchronization point, to decode a first spreading code-encoded signal from the combined signal, using a first spreading code; and perform a second decoding, without performing the synchronization search, for decoding a second spreading code-encoded signal from the combined signal, using a second spreading code, the second decoding using the synchronization point determined in the first decoding.

In any of the preceding aspects/embodiments, the spreading code-encoded signal may be a digital signal generated by an analog-to-digital converter (ADC). The decoder may be further configured to decimate the digital signal and to output sequences of samples at different respective decimation phases. The synchronization point may further define a decimation phase to be used for decimating the digital signal.

In any of the preceding aspects/embodiments, the decoder may be further configured to control a clock phase used by the ADC, to cause the ADC to output the sequences of samples at the different respective decimation phases.

In any of the preceding aspects/embodiments, the plurality of candidate results may include, for each decimation phase, a respective plurality of time-shifted sequences. The plurality of candidate results may be obtained by: for a sequence of samples at a first decimation phase, shifting the sequence of samples using different time delays to output a plurality of time-shifted sequences for the first decimation phase, each time-shifted sequence having been shifted by a different time delay; for the first decimation phase, multiplying the respective plurality of time-shifted sequences using the spreading code to obtain a plurality of candidate results corresponding to different time delays and the first decimation phase; repeating the multiplying for each other decimation phase to obtain the plurality of candidate results corresponding to different time delays and different decimation phases. The synchronization point may be determined by: obtaining a power measurement of each candidate result after integration; and identifying the candidate result that is associated with the power measurement that satisfies the synchronization search criterion. The synchronization point may be defined to be the time delay and decimation phase corresponding to the identified candidate result.

In any of the preceding aspects/embodiments, the synchronization search criterion may be a maximum power, and the candidate result that is associated with a maximum power measurement may be used to determine the synchronization point.

In any of the preceding aspects/embodiments, the synchronization search criterion may be a predefined power threshold, and the candidate result that is associated with a power measurement above the predefined power threshold may be used to determine the synchronization point.

In any of the preceding aspects/embodiments, the decoder may be further configured to perform the decoder code synchronization by: decimating the digital signal and outputting a sequence of samples at the decimation phase defined by the synchronization point; and shifting the sequence of samples using the time delay defined by the synchronization point.

In some aspects, the present disclosure describes a receiver including a plurality of receiving paths, each receiving path being configured to receive a respective analog signal. The receiver also includes a plurality of spreading code-encoders, each spreading code-encoder being configured to encode a respective received analog signal on a respective receiving path using a respective spreading code and to output a respective spreading code-encoded analog signal. The receiver also includes a spreading code source configured to provide the respective spreading codes to the plurality of spreading code-encoders via respective code transmitting paths, the spreading code source being further configured to perform an encoder code synchronization to compensate for any time difference among the spreading codes caused by path delays among the code transmitting paths. The receiver also includes at least one combiner, the combiner being configured to combine the respective spreading code-encoded analog signals and to output a combined analog signal. The receiver also includes at least one analog to digital converter (ADC) configured to convert the combined analog signal to a combined digital signal. The receiver also includes a decoder configured to decode the combined digital signal and output decoded signals corresponding to the received analog signals. The decoder is configured to, for decoding a first spreading code-encoded signal from the combined digital signal: perform a decoder code synchronization to align a starting time reference of a spreading code, which was used to generate the first spreading code-encoded signal, with a starting time reference of the combined digital signal; and decode the first spreading code-encoded signal using the aligned spreading code.

In any of the preceding aspects/embodiments, the decoder may be further configured to perform at least one synchronization search to determine a synchronization point for performing the decoder code synchronization, the synchronization point defining at least a time delay for aligning the starting time reference of the spreading code with the starting time reference of the combined digital signal. The synchronization search may be performed by: obtaining a plurality of candidate results, each candidate result being a decoding attempt that applies at least a respective time delay for aligning the spreading code with the first spreading code-encoded signal; and determining the synchronization point by identifying at least the time delay corresponding to the candidate result that is associated with a power measurement that satisfies a synchronization search criterion.

In any of the preceding aspects/embodiments, the decoder may be further configured to: perform a first decoding, including performing the synchronization search to determine the synchronization point, for decoding a first spreading code-encoded signal using a first spreading code; and perform a second decoding, without performing the synchronization search, for decoding a second spreading code-encoded signal using a second spreading code, the second decoding using the synchronization point determined in the first decoding.

In any of the preceding aspects/embodiments, each spreading code-encoder may be an in-phase and quadrature-phase (I/Q) encoder. The I/Q encoder may be configured to encode an in-phase (I) component of the respective received analog signal and a quadrature-phase (Q) component of the respective received analog signal, to output an encoded I analog signal and an encoded Q analog signal. The at least one combiner may include: an I combiner for combining the encoded I analog signals and output an I combined analog signal; and a Q combiner for combining the encoded Q analog signals and output a Q combined analog signal. The receiver may include at least two ADCs, each ADC being configured to convert a respective one of the I combined analog signal and the Q combined analog signal and to output a respective one of an I combined digital signal and a Q combined digital signal on respective signal paths.

In any of the preceding aspects/embodiments, the decoder may be further configured to perform a decoder input synchronization by: performing a time delay adjustment to compensate for any time difference between the I combined digital signal and the Q combined digital signal caused by path delays on the respective signal paths.

In some aspects, the present disclosure describes a method for decoding a spreading code-encoded signal. The method includes: receiving a spreading code-encoded signal; and decoding the received spreading code-encoded signal by: performing a synchronization search to determine a synchronization point, the synchronization point defining at least a time delay for aligning a starting time reference of a spreading code, which was used to generate the received spreading code-encoded signal, with a starting time reference of the received spreading code-encoded signal. The synchronization search is performed by: obtaining a plurality of candidate results, each candidate result being a decoding attempt that applies at least a respective time delay for aligning the spreading code with the received spreading code-encoded signal; and determining the synchronization point by identifying at least the time delay corresponding to the candidate result that is associated with a power measurement that satisfies a synchronization search criterion.

The decoding also includes: performing a decoder code synchronization to align the starting time reference of the spreading code with the starting time reference of the received spreading code-encoded signal, using the synchronization point; and decoding the received spreading code-encoded signal using the aligned spreading code.

In any of the preceding aspects/embodiments, the received spreading code-encoded signal may be received in a combined signal combining a plurality of spreading code-encoded signals. The method may further include: performing a first decoding, including performing the synchronization search to determine the synchronization point, to decode the received spreading code-encoded signal from the combined signal, using the spreading code; and performing a second decoding, without performing the synchronization search, to decode a second spreading code-encoded signal from the combined signal, using a second spreading code, the second decoding using the synchronization point determined in the first decoding.

In any of the preceding aspects/embodiments, the spreading code-encoded signal may be a digital signal generated by an analog-to-digital converter (ADC). The method may further include: decimating the digital signal to output sequences of samples at different respective decimation phases, and wherein the synchronization point further defines a decimation phase to be used for decimating the digital signal.

In any of the preceding aspects/embodiments, the plurality of candidate results may include, for each decimation phase, a respective plurality of time-shifted sequences. The plurality of candidate results may be obtained by: for each decimation phase: for a sequence of samples at a first decimation phase, shifting the sequence of samples using different time delays to output a plurality of time-shifted sequences for the first decimation phase, each time-shifted sequence having been shifted by a different time delay; and for the first decimation phase, multiplying the respective plurality of time-shifted sequences using the spreading code to obtain a plurality of candidate results corresponding to different time delays and the first decimation phase; repeating the multiplying for each other decimation phase to obtain a plurality of candidate results corresponding to different time delays and different decimation phases. The synchronization point may be determined by: obtaining a power measurement of each candidate result after integration; and identifying the candidate result that is associated with the power measurement that satisfies the synchronization search criterion. The synchronization point may be defined to be the time delay and decimation phase corresponding to the identified candidate result.

In any of the preceding aspects/embodiments, the synchronization search criterion may be a maximum power, and the candidate result that is associated with a maximum power measurement may be used to determine the synchronization point.

In any of the preceding aspects/embodiments, the synchronization search criterion may be a predefined power threshold, and the candidate result that is associated with a power measurement above the predefined power threshold may be used to determine the synchronization point.

In any of the preceding aspects/embodiments, performing the decoder code synchronization may include: decimating the digital signal and outputting a sequence of samples at the decimation phase defined by the synchronization point; and shifting the sequence of samples using the time delay defined by the synchronization point.

In any of the preceding aspects/embodiments, the received spreading code-encoded signal may be received in a combined signal combining a plurality of spreading code-encoded signals. The method may further include: encoding a respective analog signal using a respective spreading code to output a respective spreading code-encoded signal; and prior to encoding the respective analog signals, performing an encoder code synchronization to compensate for any time difference among the spreading codes used for encoding.

BRIEF DESCRIPTION OF THE DRAWINGS

For a more complete understanding of the present invention, and the advantages thereof, reference is now made to the following description taken in conjunction with the accompanying drawings, in which:

FIG. 7 is a flowchart of an example method that may be carried out by the example receiver of FIG. 4A.

Similar reference numerals may have been used in different figures to denote similar components.

DETAILED DESCRIPTION

In a radio frequency (RF) communication network, it may be desirable to provide a receiver with the ability to support communications that use analog spreading. The present disclosure describes methods and receivers that perform various synchronizations, including synchronization of spreading code during decoding, to enable accurate recovery of data from received analog signals.

Figure 1A:
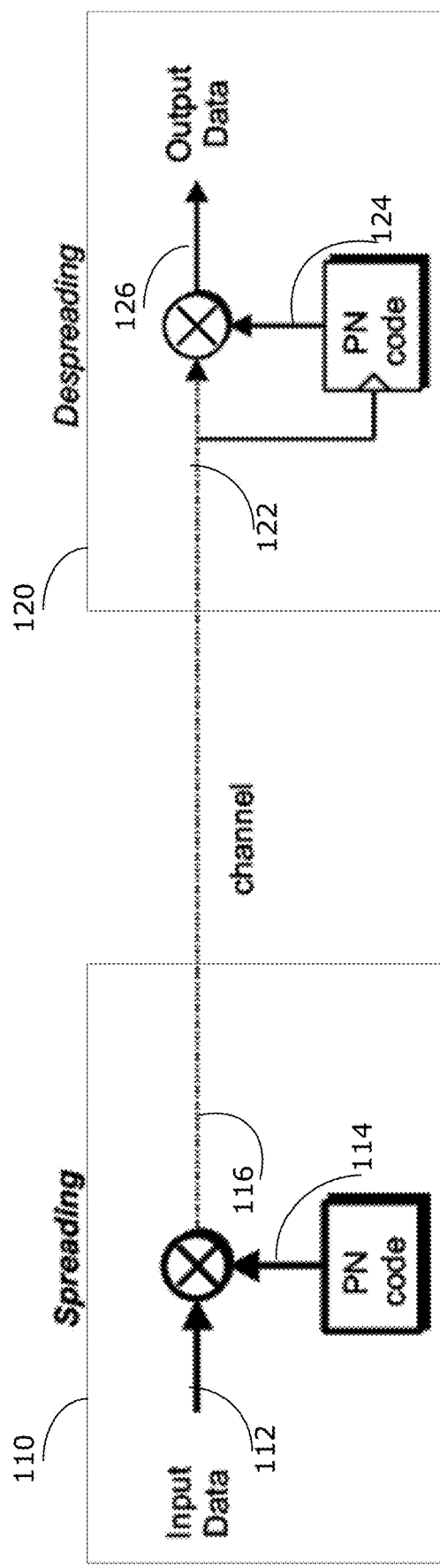
FIG. 1A is a schematic diagram of a conventional transmitter and receiver for communicating a spread spectrum signal.

FIG. 1A is a simplified diagram illustrating communication of a spread spectrum signal between a conventional transmitter 110 and a conventional receiver 120. The transmitter 110 performs spreading of a data signal using a spreading code that is independent of the data signal. The spreading code, in this case a Pseudo-Noise (PN) code 114, serves as a modulation waveform to spread the energy of the data signal 112 over a bandwidth that is greater than the original data signal's bandwidth. Although a PN code is illustrated and discussed below as the spreading code, this is only illustrative and other types of spreading codes may be used.

In the transmitter 110, the data signal 112 is multiplied with the PN code 114 to generate the transmitted baseband signal 116. The baseband signal 116 carries all of the information from the data signal 112. In the receiver 120, assuming negligible interference over the transmission channel, the received signal 122 is same as the transmitted baseband signal 116. The received signal 122 is multiplied with a second PN code 124 (also referred to as the local PN code 124 at the receiver 120), in order to recover the original data signal 112. If the receiver 120 does not know the PN code 114 used by the transmitter 110 to generate the baseband signal 116, the original data signal 112 cannot be recovered accurately. The original data signal 112 is considered to be recovered accurately when the output signal 126 at the receiver 120 carries the same information as the original data signal 112, without significant distortion, interference and/or jamming.

Synchronization of spreading codes at the receiver is important to ensure good recovery of the data signal 112. Generally, the receiver 120 may know the algorithm to generate the second PN code 124 locally, but the receiver 120 typically does not know the starting time reference of the received signal 122. If the receiver 120 does not use the correct phase (or timing) for the local PN code 124, the receiver 120 may not be able to correctly align the starting time reference of the local PN code 124 with the starting time reference of the received signal 122. The result is that the output signal 126 may not be accurate, or the attempt to generate the output signal 126 may fail. In the present disclosure, the starting time reference of a signal is defined as the starting time point of an encoded signal, which also corresponds to the start point of the spreading code used to encode the signal. The starting time reference may depend on time delays that are incurred when a data signal is mixed with a spreading code. It should be understood that the starting time reference for the encoded signal may not be the same as the starting time of a transmitted or received signal. For example, the encoded signal may be preceded by noise in the received signal.

To accurately recover the data signal at the receiver 120, it is necessary to for the starting time reference of the local PN code 124 and the starting time reference of the received signal 122 to be aligned. In conventional approaches, cross-correlation algorithms are used in the digital domain for determining how to align the local PN code 124 and the received signal 122. After calculating the cross-correlation result between the local PN code 124 and the received signal 122, the maximum of the cross-correlation function indicates the point where the starting time reference of the local PN code 124 and the starting time reference of the received signal are aligned.

Figure 1B:
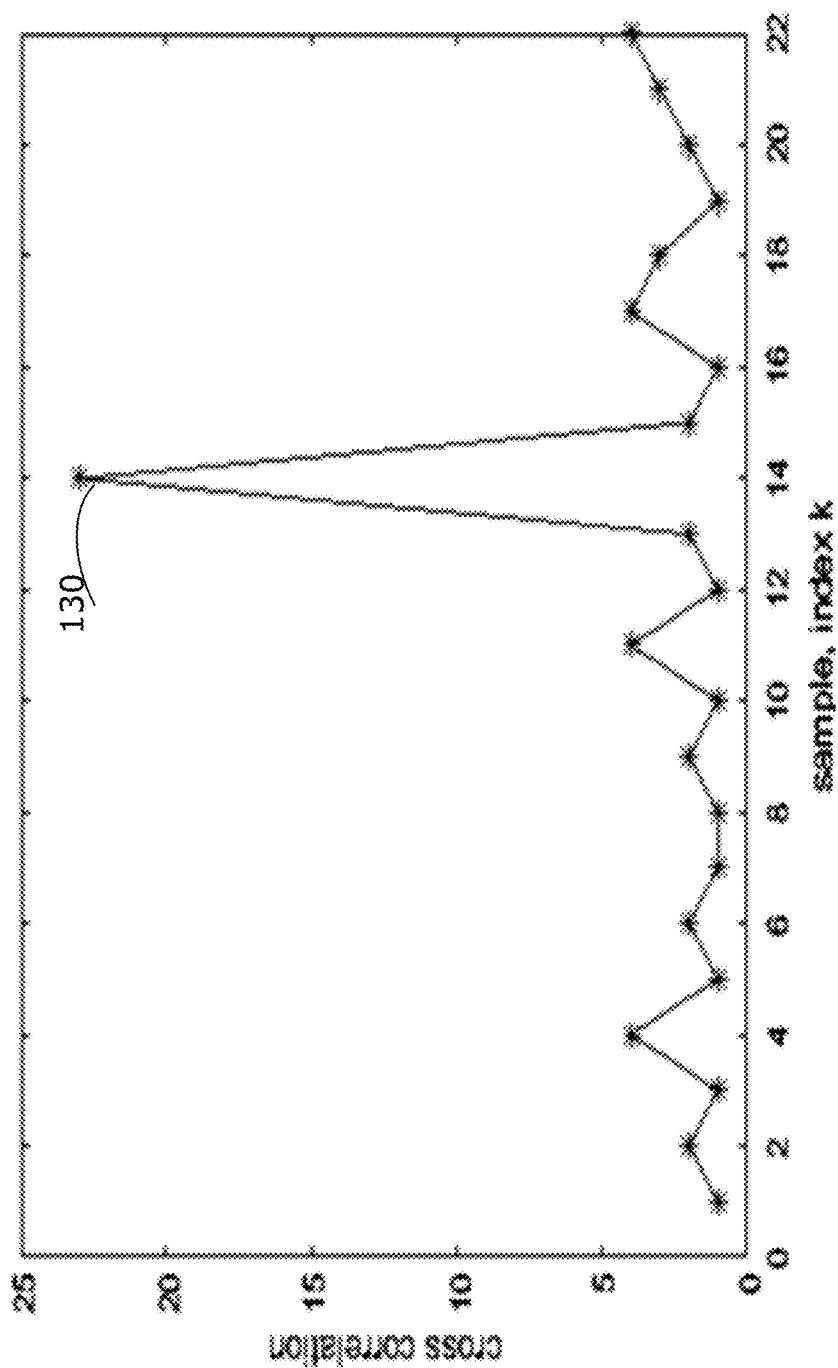
FIG. 1B is a plot of conventional cross-correlation results between a spreading code and a received signal in the digital domain.

FIG. 1B shows example cross-correlation results between a received digital signal and a local code at the receiver. The correlation peak 130 indicates the synchronization point where the received digital signal and the local code are aligned. This information is used to synchronize the local code with the received digital signal, in order to decode the received digital signal and recover the original data signal. In a conventional code division multiple access (CDMA) system, the synchronization point can be readily determined based on a clear peak in the cross-correlation results. This is because the value of the encoded signal received by the encoder is substantially constant during a code period, and simple cross-correlation between two digital signals gives relatively unambiguous results.

Figure 2:
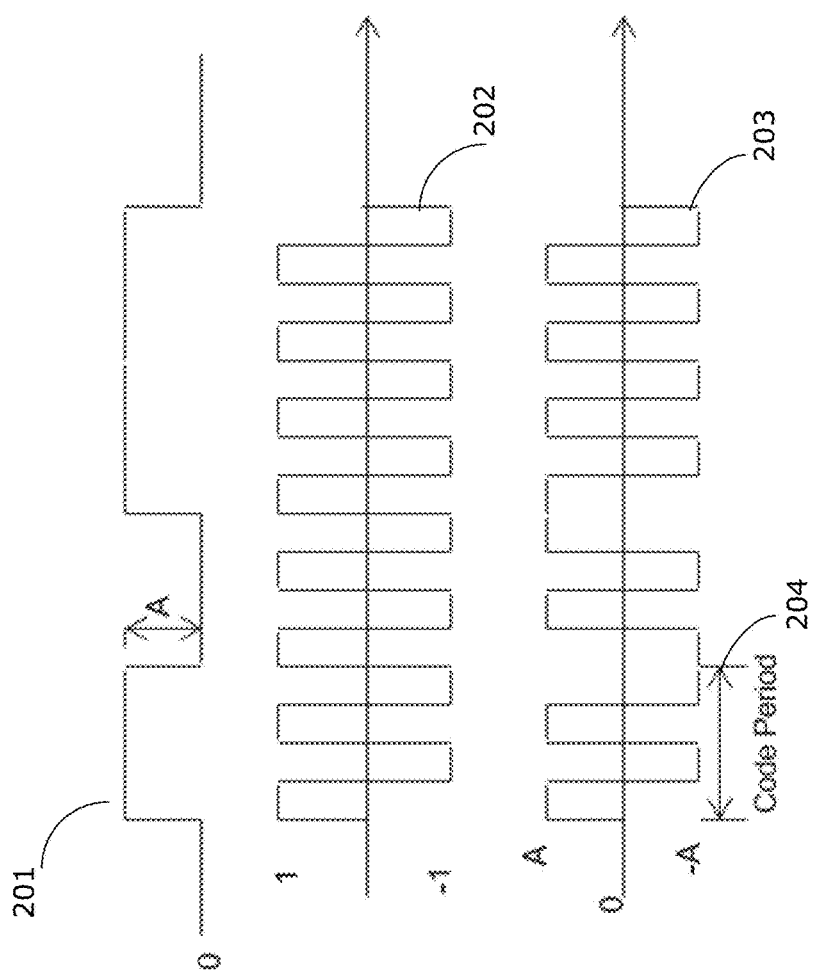
FIG. 2 is a waveform representation of a conventional encoding process in the digital domain.

For example, FIG. 2 shows an example digital input signal 201 with amplitude A. The input signal 201 is encoded using a PN code 202. The encoded output 203 is also a digital signal with binary values of A or −A. Cross-correlation between the encoded output 203 and the PN code 202 is fairly straightforward and will give a clear indication of the synchronization point (e.g., a clear correlation peak 130 as shown in FIG. 1B). Notably, the input signal 201 is substantially constant during the code period 204 of the PN code 202.

Figure 3A:
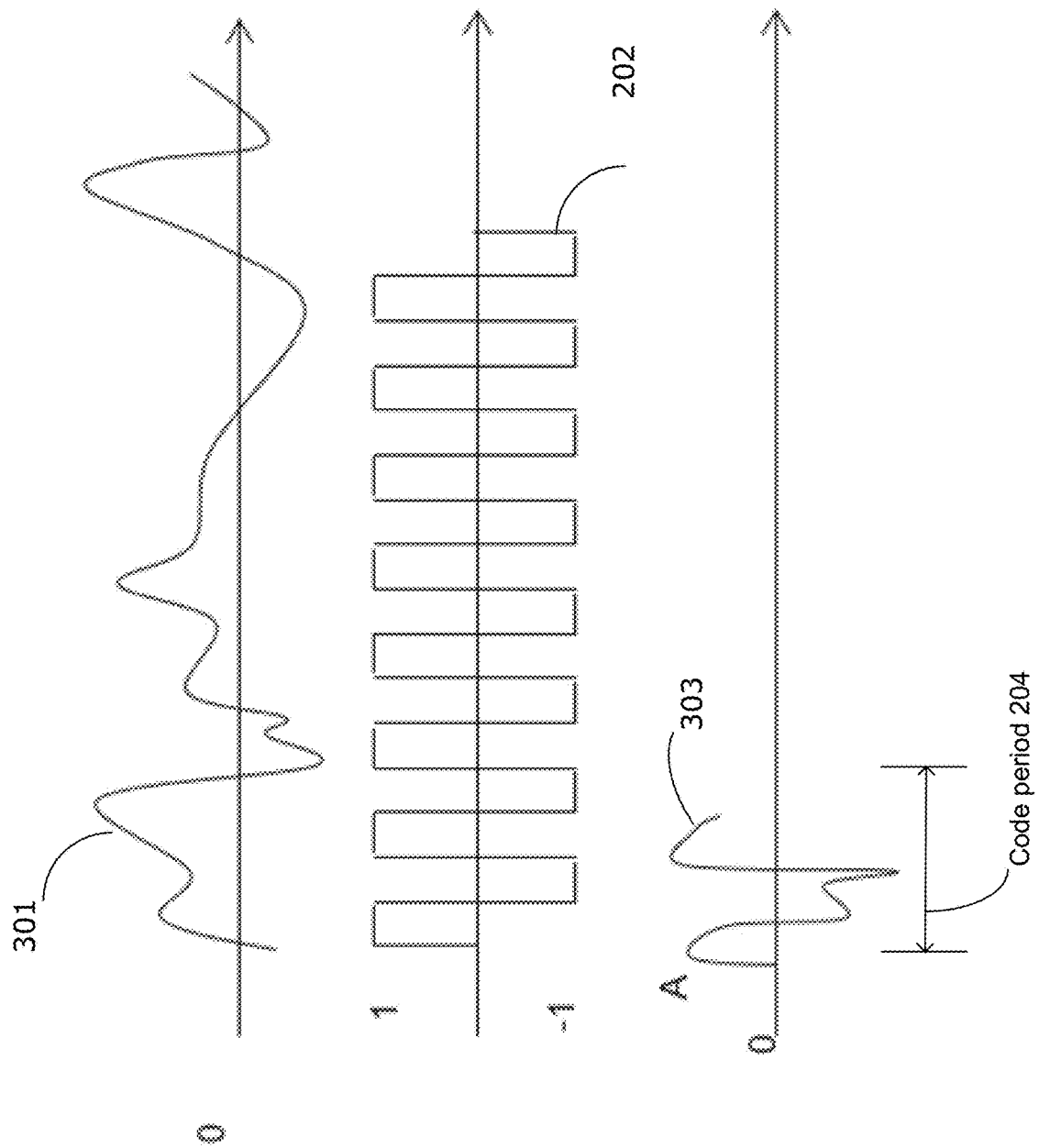
FIG. 3A is a waveform representation of an encoding process in the analog domain.
Figure 3B:
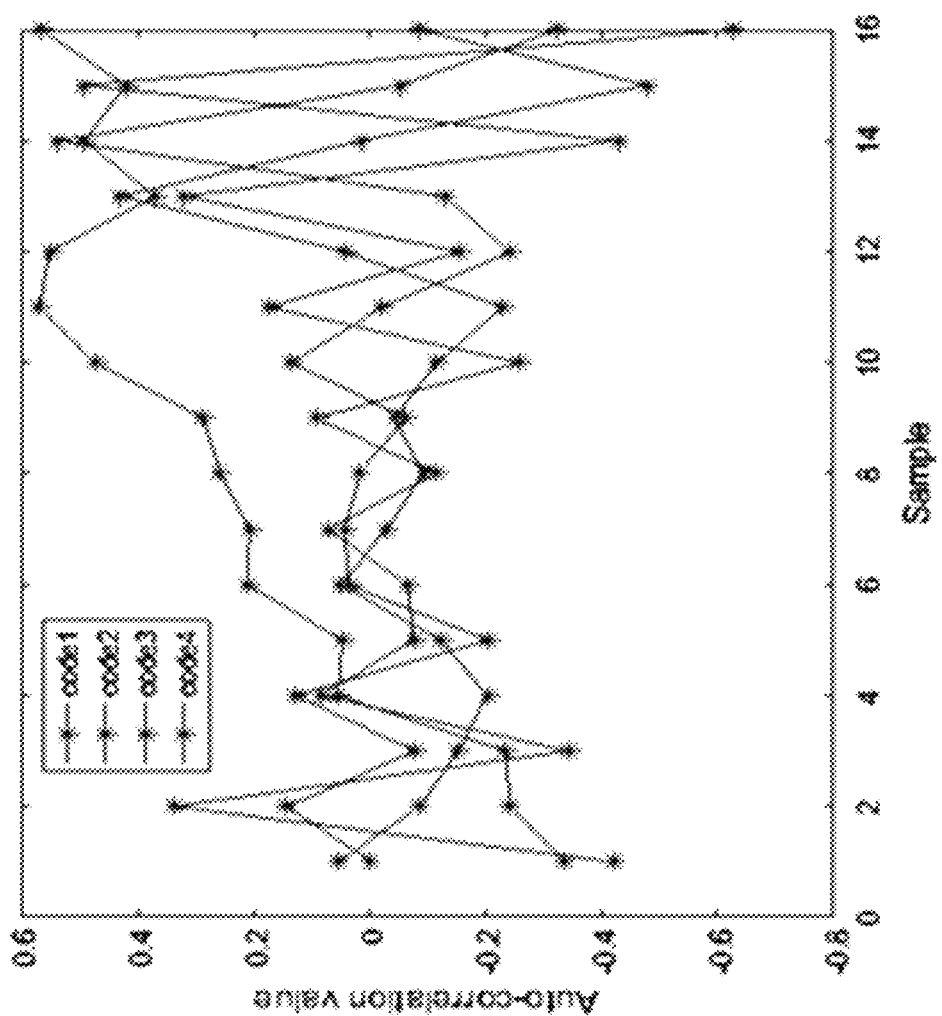
FIG. 3B shows plots for cross-correlation calculation results between spreading codes and spreading code-encoded signals in the analog domain.

In comparison, FIG. 3A shows an encoded analog output 303 that is generated by encoding an analog input signal 301 using the PN code 202. The analog output 303 may have a range of values, which can lead to difficulties in determining a synchronization point. Consider the case where four different encoded outputs 303 are generated using four different respective PN codes (codes 1 to 4). FIG. 3B shows cross-correlation calculation results for each PN code. As can be seen in FIG. 3B, there is no clear correlation peak and hence no synchronization point can be determined using the simple cross-correlation approach. This is because the analog input signal 301 in the analog domain is not constant within the code period 204, unlike the binary values of a digital signal.

There are other challenges in synchronizing a local code at the receiver, such as the need to take into account differences path delays over transmission lines.

In various examples, the present disclosure describes a receiver that implements various synchronizations to help to ensure that each received analog signal is recovered without significant interference, distortion and/or jamming. The disclosed receiver may address at least some drawbacks of the above-discussed conventional receiver. The disclosed receiver may be used in various applications, including in electronic devices, such as user equipment (UE) or base stations in wired or wireless communication networks. Although described in the context of a receiver, aspects of the present disclosure may also be implemented as an apparatus that performs decoding, including performing synchronization, as discussed further below.

Figure 4A:
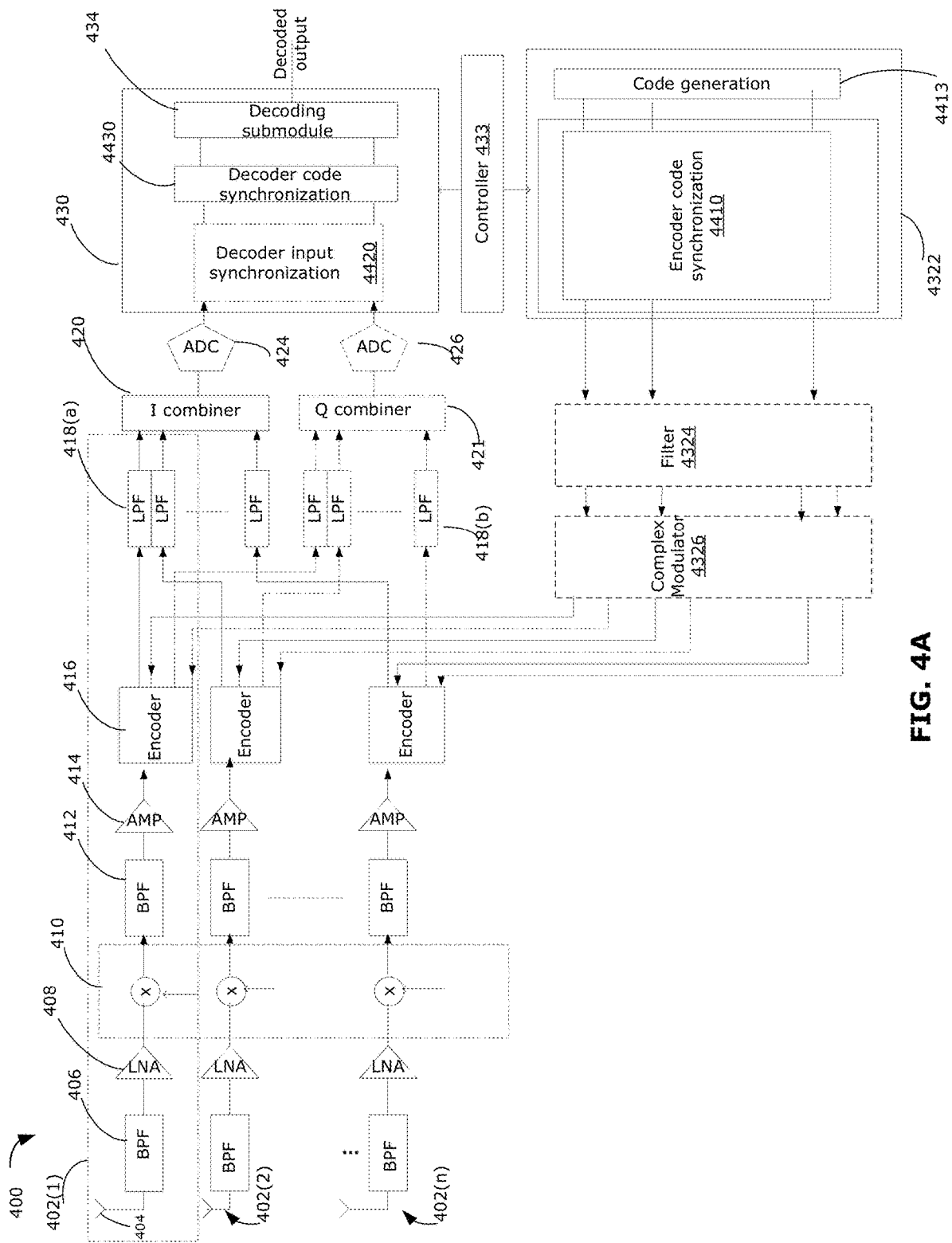
FIG. 4A is a schematic diagram of a receiver according to an example embodiment.

FIG. 4A is a schematic diagram of an example receiver 400 in accordance with an example embodiment. The receiver 400 implements synchronization functions to more accurately recover data from received analog signals. The receiver 400 includes a plurality of receiving (Rx) paths 402(1) to 402(n) (generically referred to as Rx path 402) on which a plurality of RF analog signals are received and processed. The number of Rx paths 402 being used corresponds to the number of RF analog signals received. For clarity, one Rx path 402(1) is indicated by a dashed box. Although described in the context of wireless communications, it should be understood that the receiver 400 may be used (with appropriate modifications where necessary) for wired communications. For example, the Rx paths 402 may receive RF analog signals from a wired source rather than a wireless source. For simplicity, the receiver 400 will be described below in the context of wireless communications.

One Rx path 402 will now be described in detail. In the Rx path 402, an RF analog signal is received by an antenna 404 (or antenna array). The RF analog signal received by the antenna 404 is filtered by a band-pass filter (BPF) 406 to a particular frequency band. The filtered signal from the BPF 406 is provided to a low-noise amplifier (LNA) 408 to amplify the low power filtered signal to a desired amplitude. The amplified signal is then provided to another BPF 412 and another amplifier (AMP) 414 successively. In some example embodiments, the output from the LNA 408 may be processed by an optional down-converter 410 before being provided to the second BPF 412. The output from the AMP 414 is provided to an encoder 416. The encoder 416 provides encoding using a spreading code. In some example embodiments, the spreading code may be a PN code; however, any suitable spreading code may be used. Accordingly, the encoder 416 may also be referred to generally as a spreading code-encoder or in some cases as a PN-encoder. The encoders 416 in each Rx path 402 each use a different respective spreading code for encoding.

In some example embodiments, the encoder 416 may be an in-phase (I) and quadrature-phase (Q) encoder (referred to as an I/Q encoder), which performs spreading code-encoding over I and Q branches. In other examples, the encoder 416 may be a real encoder that outputs an encoded signal having only a real component. The I/Q encoder outputs a spreading code-encoded I analog signal (also referred to as the I component of a spreading code-encoded analog signal) and a spreading code-encoded Q analog signal (also referred to as the Q component of a spreading code-encoded analog signal). When distinct information signals are separately processed over I and Q branches, the number of channels operating within the receiver is effectively doubled. In the example of FIG. 4A, dashed paths indicate the signal path for Q components, if the encoder 416 is an I/Q encoder. The spreading code-encoded I analog signal and the spreading code-encoded Q analog signal are filtered by LPFs 418(*a*) and 418(*b*) separately. The output from each Rx path 402 are a filtered spreading code-encoded I analog signal and a filtered spreading code-encoded Q analog signal.

An I combiner 420 combines the filtered spreading code-encoded I analog signals from the plurality of Rx paths 402 into a I combined analog signal, and a Q combiner 422 combines the filtered spreading code-encoded Q analog signals from the plurality of Rx paths 402 into a Q combined analog signal. A first ADC 424 converts the I combined analog signal to an I combined digital signal, and a second ADC 426 converts the Q combined analog signal to a Q combined digital signal. An I and Q decoder 430 (also referred to as an I/Q decoder) decodes the I combined digital signal and Q combined digital signal to a plurality of decoded digital outputs (e.g., using a decoding submodule 434). In the example shown, the decoded outputs are outputted from the decoder 430 as a single serial output. In other examples, the decoded outputs may be outputted from the decoder 430 as multiple parallel outputs. The plurality of decoded digital outputs may be provided to other components of the communication device, such as a digital signal processor.

In the example shown in FIG. 4A, the encoder 416 is an I/Q encoder that outputs a spreading code-encoded I analog signal and a spreading code-encoded Q analog signal, which may be separately processed by separate I and Q combiners 420, 421 and ADCs 424, 426. In other examples, the encoder 416 may be a real encoder. In such examples, one LPF may be used instead of separate LPFs 418(*a*), 418(*b*) in each Rx path 402. A single combiner may be used instead of separate I and Q combiners 420, 421, and a single ADC may be used instead of two ADCs 424, 426 to output one combined digital signal. Moreover, the decoder 430 may decode the combined digital signal over the real channel.

In the example shown in FIG. 4A, the receiver 400 may include a spreading code source 4322 to provide the respective spreading codes used by each encoder 416. The receiver 400 may also include a controller 433 for providing control signals to control the operation of the spreading code source 4322 and the decoder 430. The spreading code source 4322 and the controller 433 are described in greater detail below. In some examples, the receiver 400 may not include the spreading code source 4322 and/or may not include the controller 433. For example, the spreading codes may be generated by an external component and provided to the receiver 400. In some examples, external control signals may be used to control the operation of the decoder 430 and the operation of the spreading code source 4322, or the control signals may not be needed.

In the following description, the example receiver 400 is described as processing signals over I and Q channels (e.g., where the encoder 416 is an I/Q encoder). In other examples, the receiver 400 may process signals over a real channel (e.g., where the encoder 416 encodes over a real channel only).

The I/Q encoder 416 performs encoding using a spreading code (such as a PN code). Each I/Q encoder 416 in a respective Rx path 402 uses a different respective spreading code for encoding. In this example, the receiver 400 includes the spreading code source 4322 to generate (e.g., using a code generation submodule 4413) the respective spreading codes. The spreading codes are mutually orthogonal. The number of spreading codes provided by the spreading code source 4322 corresponds to the number of Rx paths 402 being used. In some example embodiments, one or more parameters (such as code type, code length, and code rate) for generating the spreading codes is variable and may be controlled by a control signal (e.g., a control signal from the controller 433 or an external control signal). The parameter (s) for generating the spreading codes may be selected to achieve desired performance characteristics. The spreading code source 4322 in this example implements an encoder code synchronization 4410 to align the timing of the spreading codes arriving at the respective encoders 416. In some examples, the spreading code source 4322 may implement the encoder code synchronization 4410 without generating the spreading codes (e.g., the code generation submodule 4413 may be omitted). The encoder code synchronization 4410 will be described further below.

In some examples, the receiver 400 may include a filter 4324 (e.g., a BPF or an LPF) and a complex modulator 4326 to process the generated spreading codes before the spreading codes are provided to the encoders 416. For example, PN codes generated by the spreading code source 4322 may contain undesired harmonics, and the filter 4324 may be used to filter out the undesired harmonics. Removal of such undesired harmonics from each PN code may help to reduce interference and distortion when the received analog signal is encoded. The complex modulator 4326 may further provide complex modulation of the filtered PN codes outputted by the filter 4324. The complex modulator 4326 modulates each filtered PN code to a code modulation frequency.

Complex modulation may help to avoid the introduction of unwanted fold-in images in the encoded signal. Although the optional filter 4324 and complex modulator 4326 are shown in FIG. 4A as being separate from the spreading code source 4322, in some examples the filter 4324 and complex modulator 4326 may be considered to be part of the spreading code source 4322 (e.g., following the code generation submodule 4413), and the output of the spreading code source 4322 may be filtered and complex modulated spreading codes.

Each spreading code is transmitted from the spreading code source 4322 to a respective encoder 416 via a respective code transmitting path. The code transmitting path traveled by a particular spreading code may include transmission lines and electrical components, such as the filter 4324 and complex modulator 4326. Each spreading code provided for a respective Rx path 402 is transmitted via a different respective code transmitting path. The different code transmitting paths may introduce different path delays, which may give rise to time differences among the spreading codes when the spreading codes arrive at the respective encoders 416. As will be discussed further below, a encoder code synchronization 4410 may be performed, for example at the spreading code source 4322, to help compensate for any time difference among the spreading codes used for encoding at the encoders 416.

As mentioned previously, in order to accurately decode an encoded signal, it is necessary for the decoder 430 to align the spreading code with the encoded signal. However, the decoder 430 generally does not know the correct starting time reference for aligning the spreading code. In examples discussed further below, the decoder 430 may implement a decoder code synchronization 4430 to align the starting time reference of a given spreading code with the starting time reference of the combined digital signal (outputted from the ADCs 424, 426), as part of decoding.

In examples where there are separate I and Q spreading code-encoded signals (e.g., the encoder 416 is an I/Q encoder), separate I and Q combiners 420, 421 and separate ADCs 424, 426 may be used to process the I and Q spreading code-encoded signals separately, along different I and Q signal paths. The I and Q signal paths may include transmission lines and electrical components, such as the combiners 420, 421 and the ADCs 424, 426. There may be different path delays in the two signal paths, resulting in a time difference between the I combined digital signal and the Q combined digital signal arriving at the decoder 430. As will be discussed further below, a decoder input synchronization 4420 may be implemented, for example by the decoder 430, to help compensate for any time difference between the I combined digital signal and the Q combined digital signal.

Figure 4B:
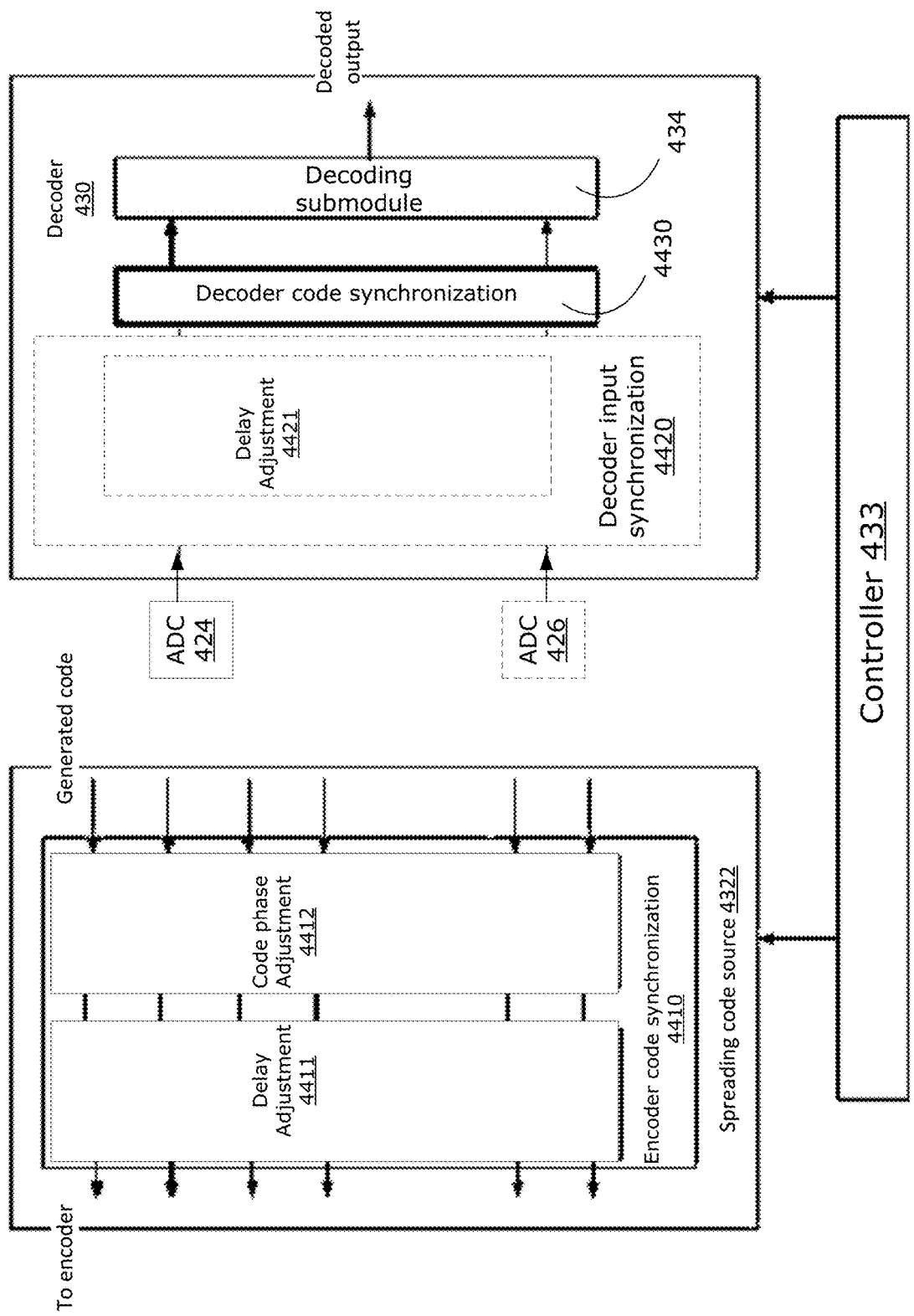
FIG. 4B is a schematic diagram illustrating synchronization functions implemented within the receiver of FIG. 4A.

Accordingly, the disclosed receiver 400 may perform various synchronizations in order to accurately decode a received signal and improve the overall device performance. Example synchronization functions are now described below in greater detail with reference to FIG. 4B. FIG. 4B shows details of the spreading code source 4322 and the decoder 430; for clarity, FIG. 4B omits some other components of the receiver 400.

As mentioned above, the spreading code source 4322 may implement an encoder code synchronization 4410 to compensate for any time difference among the spreading codes arriving at the respective encoders 416. Time differences among the spreading codes may be caused by different path delays among the code transmitting paths. In some example embodiments, the encoder code synchronization 4410 includes a first delay adjustment 4411 and a first code phase adjustment 4412, which are applied to the generated codes (e.g., from the code generation submodule, not shown in FIG. 4B). The first delay adjustment 4411 may be implemented to reduce or remove any time difference among the plurality of spreading codes, and the first code phase adjustment 4412 may be performed to align the phases of the spreading codes with respect to each other. Although FIG. 4B shows the first delay adjustment 4411 being applied following the code phase adjustment 4412, the first delay adjustment 4411 may be applied before the code phase adjustment 4412. The first delay adjustment 4411 and code phase adjustment 4412 may be implemented as a single functional block or module, rather than as separate blocks as shown.

The path delays introduced by the code transmitting paths may be characterized (e.g., during device calibration or other device setup stage) and known, and may be substantially constant. Therefore, the encoder code synchronization 4410 (including the delay adjustment 4411 and the code phase adjustment 4412) may be a static synchronization (i.e., the amount of adjustment may be unchanging over given time period). The amount of adjustment to be performed by the encoder code synchronization 4410 may be defined during device calibration or other device setup stage, for example after the path delays have been characterized.

In this example, the encoder code synchronization 4410 may be performed by the spreading code source 4322; however, in other examples, the encoder code synchronization 4410 may be performed by other components within or external to the receiver 400, such as by the controller 433 in the receiver 400 or by a controller external to the receiver 400. Although the first delay adjustment 4411 and code phase adjustment 4412 are each shown as a single block shared among the generated spreading codes, it should be understood that different amounts of delay adjustments and different phase adjustments may be applied to the different spreading codes. In some examples, the first delay adjustment 4411 and/or code phase adjustment 4412 may be implemented as independent functional blocks (rather than shared functional blocks) for each generated spreading code.

The encoder code synchronization 4410 serves to align the starting time references of the spreading codes arriving at the respective encoders 416. Reduction or elimination of time differences among the spreading codes may help to improve accuracy for processing the received analog signals.

The decoder input synchronization will now be discussed with reference to FIG. 4B. The decoder code synchronization will be discussed further below, with reference to additional figures. As mentioned previously, the decoder 430 may implement a decoder input synchronization 4420 to compensate for any time difference between the I combined digital signal and the Q combined digital signal (e.g., due to difference in path delay between I and Q signal paths). In some examples, the receiver 400 may process the received analog signals over a real channel only (e.g., the encoder 416 is not an I/Q encoder), and the combined analog signal is converted to a combined digital signal on only one signal path over a real channel. In such a case, the decoder input synchronization 4420 may not be required and may be omitted from the decoder 430.

Where the decoder input synchronization 4420 is used, the decoder input synchronization 4420 includes a second delay adjustment 4421 to reduce or remove any time difference between the I and Q signal paths. Similar to the encoder code synchronization 4410, because the path delays in the I and Q signal paths may be characterized (e.g., during device calibration or other device setup stage) and substantially constant, the decoder input synchronization 4420 may be a static synchronization that may be defined during device calibration or other device setup stage.

In the example shown, the decoder input synchronization 4420 is implemented as part of the decoder 430. In other examples, the decoder input synchronization 4420 may be performed by other components within the receiver 400 or external to the receiver 400, such as by the controller 433 within the receiver 400 or by a controller external to the receiver 400. Performing the decoder input synchronization 4420 may help to minimize or eliminate any time difference between the I combined digital signal and the Q combined digital signal arriving at the decoder 430, so that the I and Q components of the combined digital signal are accurately aligned for decoding.

As mentioned previously, in order to output an accurate decoded signal corresponding to the received analog signal, the decoder 430 needs to align timing of the encoded signal with the spreading code that is used for decoding. In the example receiver 400, the decoder 430 decodes each encoded signal from a combined digital signal. Accordingly, as described below, in order to decode a given encoded signal, the decoder 430 performs a decoder code synchronization in order to align the starting time reference of the combined digital signal with a starting time reference of a given spreading code. Specifically, for decoding a given encoded signal, the given spreading code that is aligned by the decoder code synchronization is the spreading code that was used by the encoder to generate the given encoded signal.

Accordingly, a decoder code synchronization 4430 is implemented by the decoder 430 to align a starting time reference of a spreading code with a starting time reference of the combined digital signal. Although the decoder code synchronization 4430 is illustrated as a separate block from the decoding submodule 434, it should be understood that the decoder code synchronization 4430 is performed as part of the decoding by the decoder 430. Generally, the decoder code synchronization 4430 may be performed to align the spreading code with a spreading code-encoded signal, in order to decode the spreading code-encoded signal. Although the following description refers to aligning the spreading code with a combined digital signal, it should be understood that similar operations may be performed in order to align the spreading code with a spreading code-encoded signal in general.

In some examples, the combined digital sample may be decimated prior to decoding, for example in order to reduce the sampling rate of the combined digital sample. Where decimation is performed, the decoder code synchronization 4430 may also include selecting the decimation phase that most accurately represents the encoded signal to be decoded. The decoder code synchronization 4430 is performed according to a synchronization point. The synchronization point defines the time delay to be used for aligning the given spreading code with the combined digital sample. Where decimation is performed, the synchronization point also defines the decimation phase to be used to decimate the combined digital sample.

Generally, the synchronization point may not be known beforehand. Therefore, the decoder 430 may perform at least one synchronization search to determine the synchronization point for decoding a given encoded signal. The decoder code synchronization 4430 may then be performed using the determined synchronization point and the given encoded signal may be decoded using the aligned given spreading code.

Figure 4C:
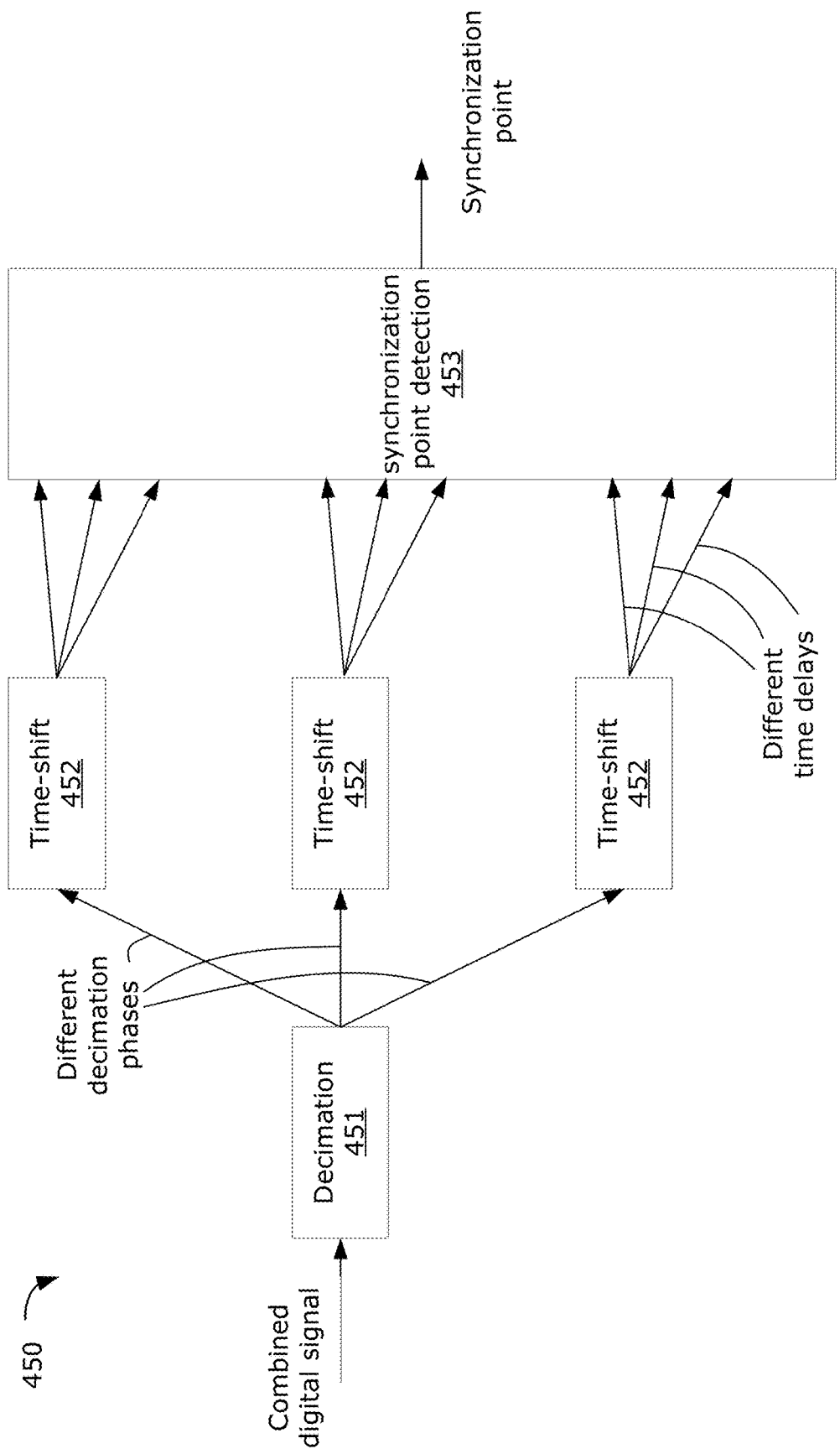
FIG. 4C is a block diagram illustrating stages for implementing a synchronization search according to an example embodiment.

An example synchronization search 450 for determining the synchronization point is illustrated in FIG. 4C. The synchronization search 450 may be performed by the decoder 430, as part of the decoder code synchronization 4430. In some examples, once the synchronization point has been found for decoding one encoded signal from the combined digital signal, the same synchronization point may be used for decoding one or more other encoded signals from the combined digital signal. In some examples, the synchronization search 450 may be performed for decoding each encoded signal from the combined digital signal.

FIG. 4C shows multiple stages, including decimation function 451, time-shift function 452, and synchronization point detection function 453, to perform the synchronization search 450. The combined digital signal (e.g., outputted by the ADC) is decimated by the decimation function 451, resulting in sequences of samples at different respective decimation phases. The decimation function 451 may be performed by any suitable decimation module, such as that described below with reference to FIGS. 4E to 4G.

Figure 4D:
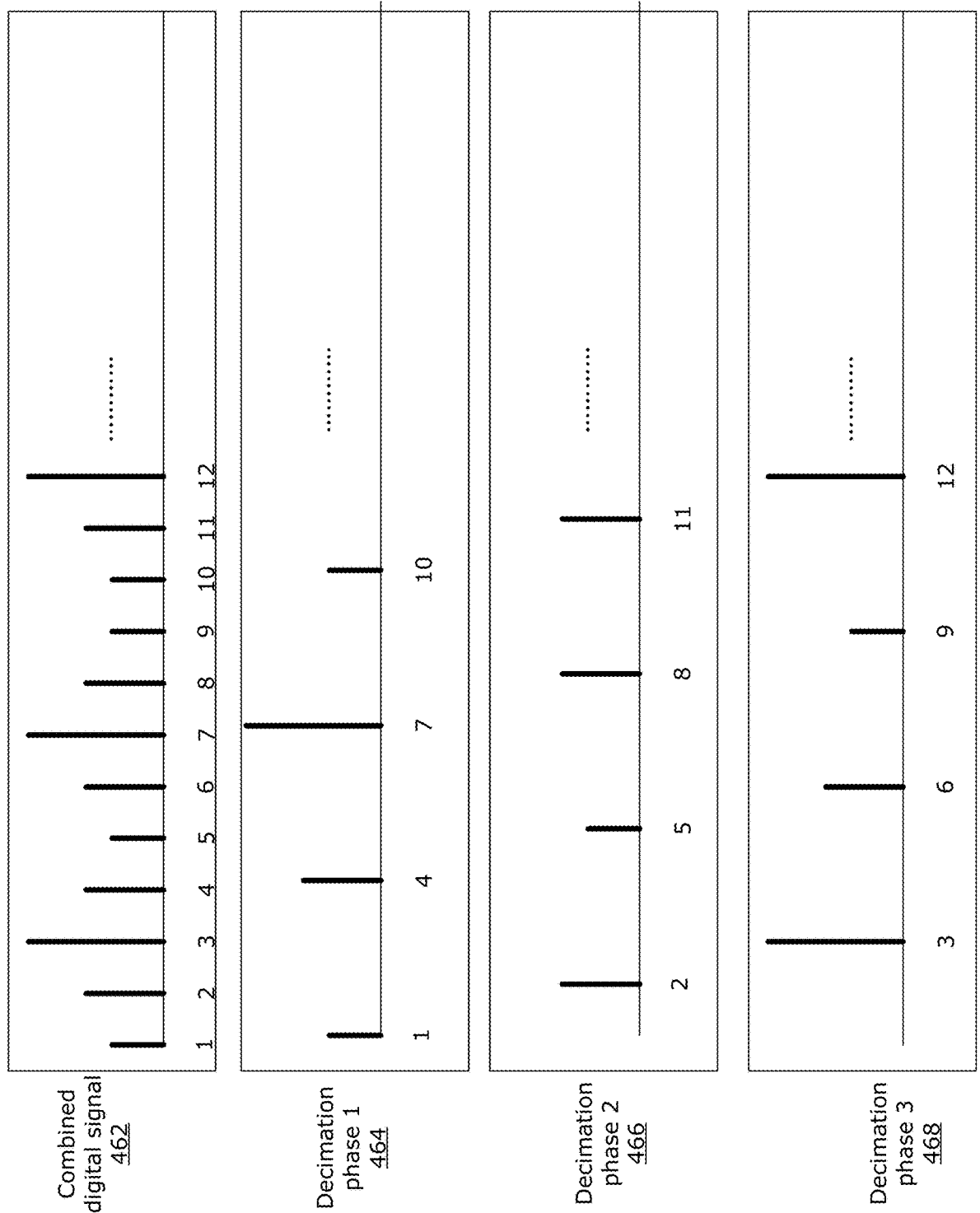
FIG. 4D illustrates an example of different sequences of samples at different decimation phases.

FIG. 4D illustrates how decimation can give rise to sequences with different decimation phases. The combined digital signal 462 is represented by a sequence of samples 1 to 12. To decimate the combined digital signal 462 to a sequence of samples having a lower sampling rate, different sequences of samples are generated based on a fixed decimation interval and different start samples. For example, given a decimation interval of 3, the start sample for the decimation may be selected to be sample 1. Then a sequence at decimation phase 1 464 is generated, including samples 1, 4, 7, and 10. If the start sample for the decimation is selected to be sample 2, then a sequence at decimation phase 2 466 is generated, which includes samples 2, 5, 8, and 11. If the start sample for the decimation is selected to be sample 3, then a sequence at decimation phase 3 468 is generated, having samples 3, 6, 9, and 12. In this example, 3 different sequences of samples are generated at 3 different respective decimation phases. As shown in FIG. 4D, the sampling rates of sequences 464, 466, 468 are the same, and are lower than the sampling rate of the combined digital signal 462. In general, if the decimation interval is M, M different sequences of samples are outputted on M different decimation phases.

Reference is against made to FIG. 4C. After performing the decimation function 451, the time-shift function 452 is performed for the sequences of samples at each decimation phase. The time-shift function 452 applies different time delays to each sequence of samples, to obtain a plurality of time-shifted sequences at each decimation phase. These time-shifted sequences, at different decimation phases, are candidates for detecting the synchronization point, each candidate being generated using a particular decimation phase and time delay. Then the synchronization point detection function 453 is used to determine the synchronization point for aligning a given spreading code. Performing the synchronization point detection function 453 involves making decoding attempts, in this case multiplying the given spreading code with each candidate time-shifted sequence at each decimation phase, to obtain a plurality of candidate results. The candidate results are integrated and a power measurement is obtained. The synchronization point detection function 453 then identifies the candidate result associated with the power measurement that satisfies a synchronization search criterion (e.g., having maximum power or satisfying a predefined power threshold). The decimation phase and time delay corresponding to the identified candidate result determine the synchronization point.

Generally, the decimation function 451 may generate output over M different decimation phases, and the time-shift function 452 may generate output over N different time delays, thus resulting in M×N candidate time-shifted sequences that are processed at the synchronization point detection function 453. In the example shown in FIG. 4C, there are three different decimation phases that may be used for the decimation function 451, and three different time delays that may be used for the time-shift function 452. Thus, there are 3×3=9 different candidate time-shifted sequences that are processed at the synchronization point detection function 453. All possible time-shifted sequences may be processed at the synchronization point detection function 453 and the candidate result associated with the maximum power measurement may be used to determine the synchronization point. In other examples, the time-shifted sequences may be processed one at a time, and the first (or any one) candidate result that satisfies a predefined power threshold may be used to determine the synchronization point.

Figure 4E:
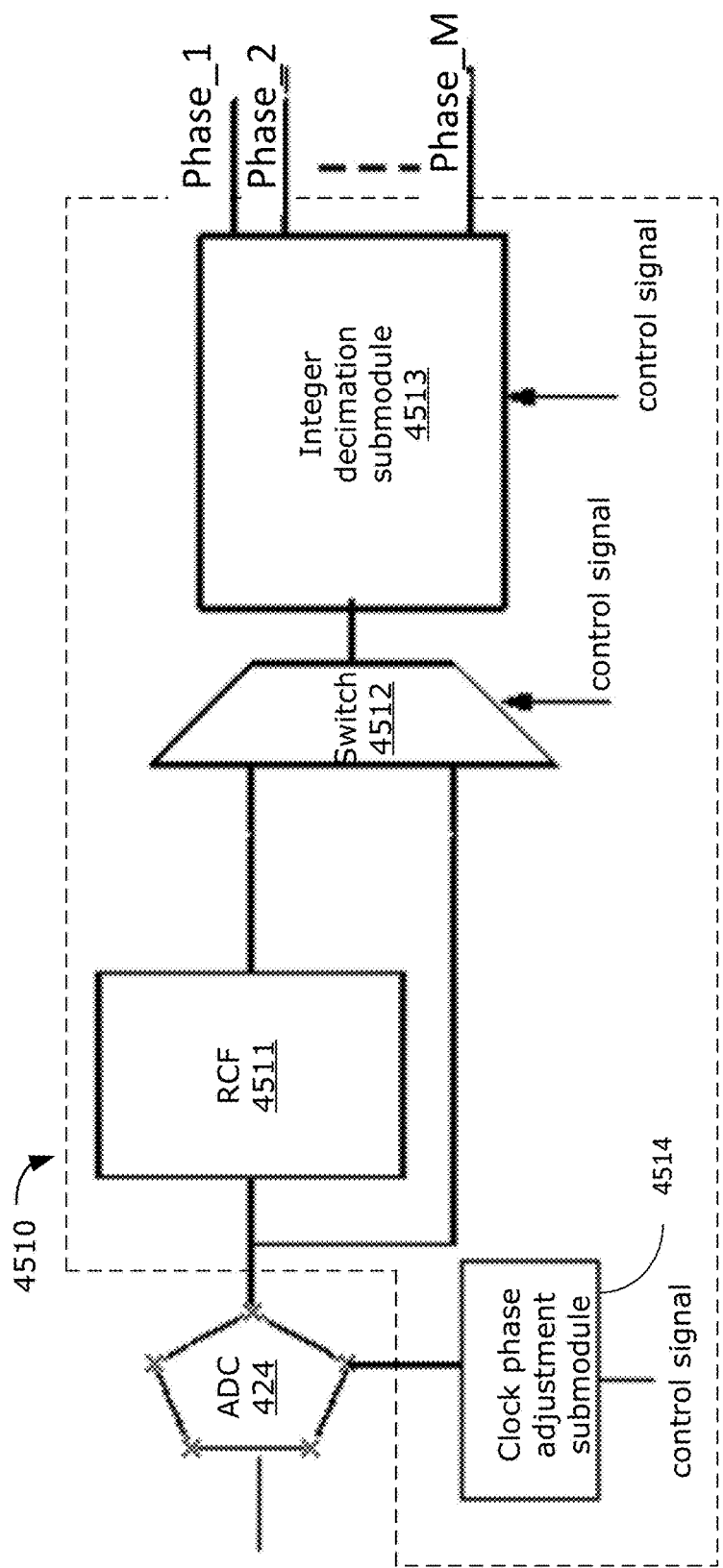
FIG. 4E is a schematic diagram of an example decimation module for implementing the decimation function of FIG. 4C.

FIG. 4E shows an example decimation module 4510 for performing the decimation function 451. Decimation may be performed to adjust the sampling rate of the combined digital signal to a particular sampling rate required by the decoder 430. Generally, the sampling rate of the combined digital signal may be dependent on the rate of the ADC 424. If the combined digital output from the ADC 424 is at a high sampling rate, the decimation module 4510 may be used to lower the sampling rate, to suit the decoder 430.

In the example of FIG. 4E, the decimation module 4510 includes a rate change filter (RCF) 4511, a switch 4512, an integer decimation submodule 4513 and a clock phase adjustment submodule 4514. The output from the decimation module 4510 is a plurality of sequences of samples, each at a different decimation phase (Phase_1 to Phase_M). The sequences of samples may be outputted in parallel or in series. For example, the sequences of samples may be outputted in parallel when the integer decimation submodule 4513 is enabled; alternatively, the sequences of samples may be outputted in series when the integer decimation submodule 4513 is disabled and the clock phase adjustment submodule 4514 is enabled. The decimation module 4510 may perform integral and/or fractional down-conversion in accordance to various decimation requirements. In some examples, the clock phase adjustment submodule 4514 may not be part of the decimation module 4510, and the functions of the clock phase adjustment submodule 4514 may instead be provided by the controller 433 or other suitable components within the receiver 400.

Figure 4F:
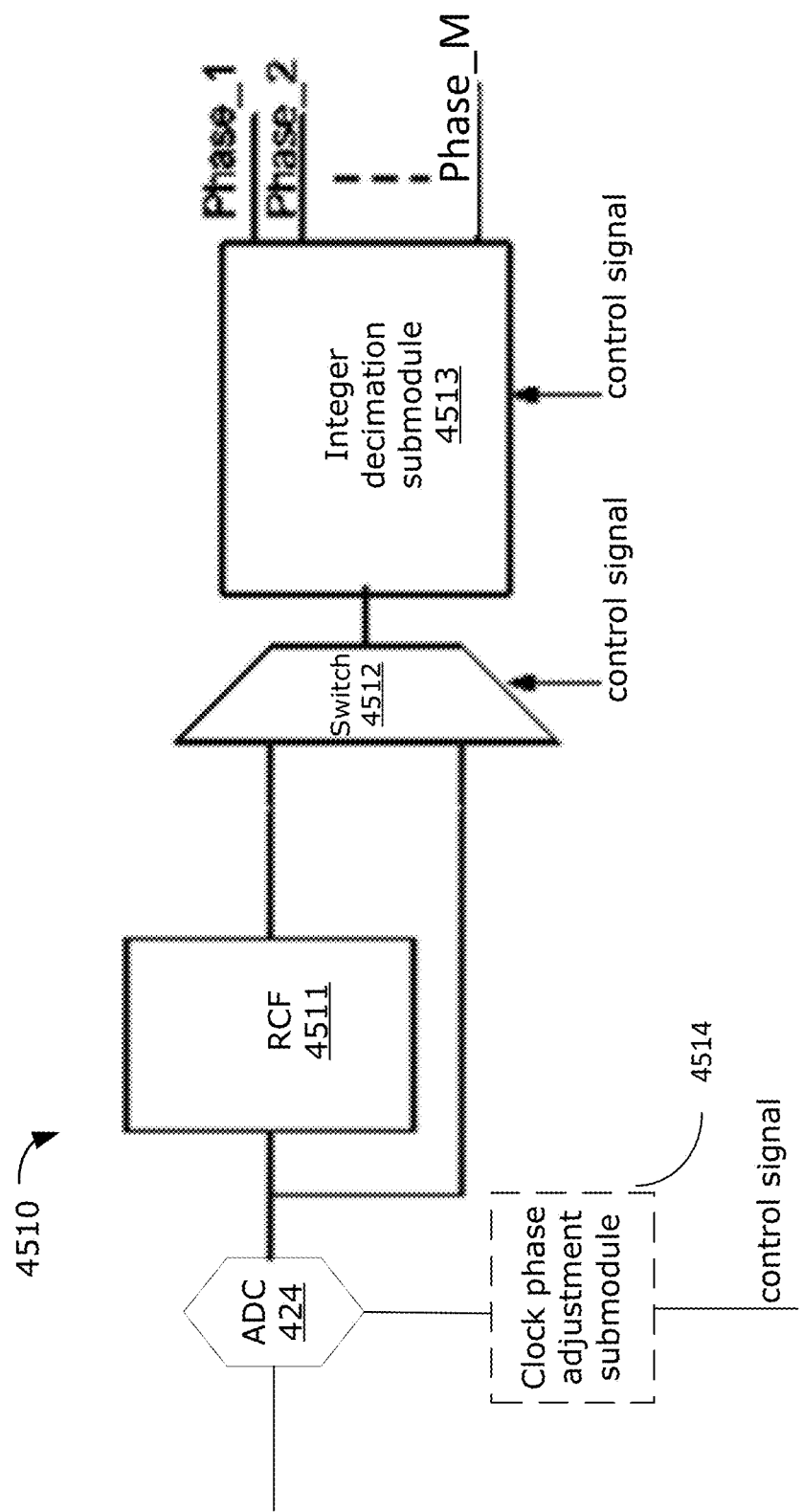
FIG. 4F is a schematic diagram of the decimation module of FIG. 4E configured to output different samples in parallel.

FIG. 4F illustrates the active blocks of the decimation module 4510 when the integer decimation submodule 4513 is enabled. The clock phase adjustment submodule 4514 may also be optionally enabled to control the ADC 424 to obtain samples close to or at the middle of the signal eye. The decimation ratio of the decimation module 4510 is determined using Equation (1) below:

$$\text{Decimation ratio} = \frac{\text{sampling rate of the combined digital signal}}{\text{sampling rate of the output of the decimation module}} \quad (1)$$

The range of the decimation ratio is from 1 to n, where n may be a fraction or an integer. If n is an integer, the RCF 4511 is bypassed. If n is a fraction, the combined digital signal is passed through the RCF 4511. The switch 4512 is controlled by a control signal (e.g., from the controller 433) to either pass on the output from the RCF 4511 or to pass on the combined digital signal bypassing the RCF 4511. The integer decimation submodule 4513 decimates the combined digital signal and outputs the sequences of samples at different respective decimation phases. The different decimation phases are the result of selecting a different start sample of the combined digital signal to start the decimation. The integer decimation submodule 4513 is controlled by a control signal (e.g., from the controller 433) to generate the sequences of samples at the different decimation phases. In some examples, the switch 4512 and/or the integer decimation submodule 4513 may be controlled by a control signal that is generated within the decimation module 4510.

Figure 4G:
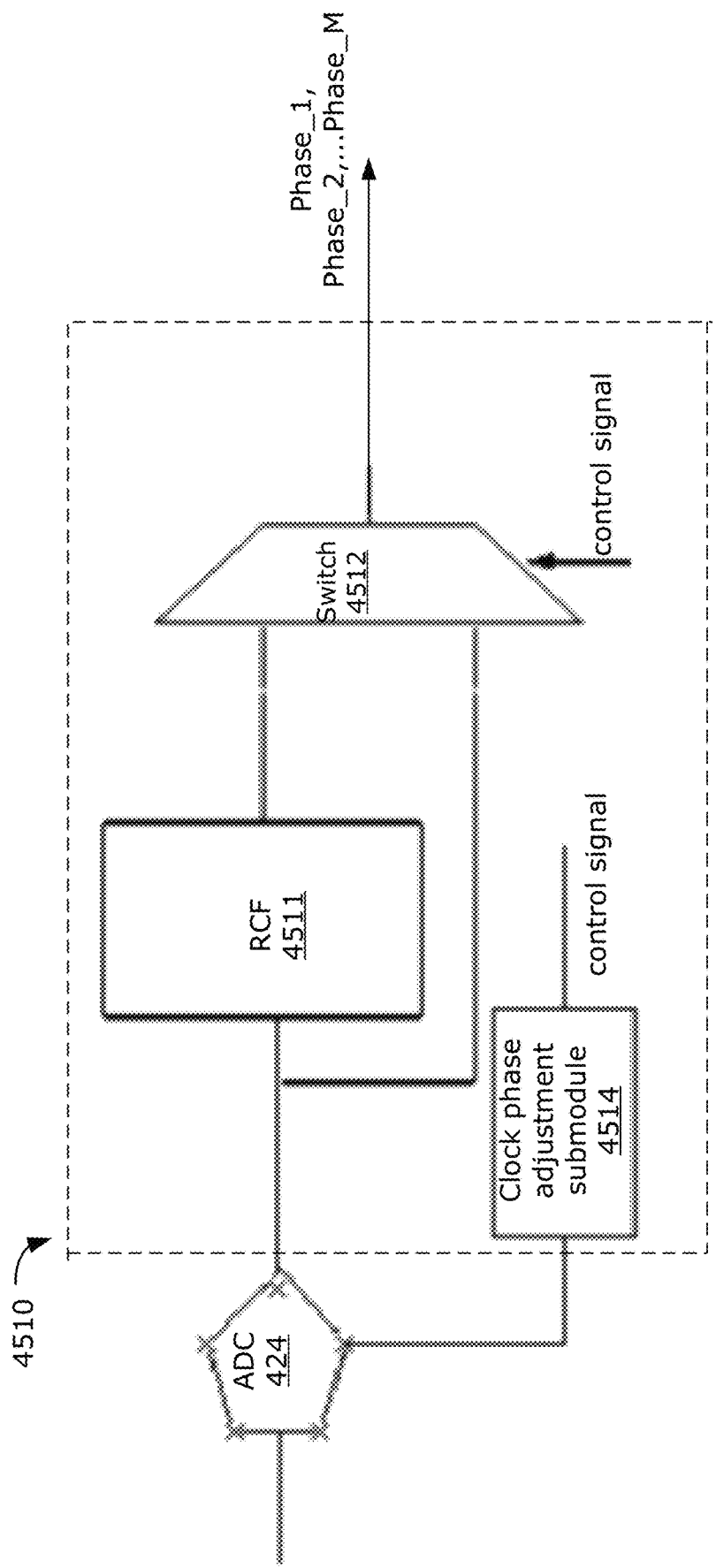
FIG. 4G is a schematic diagram of the decimation module of FIG. 4E configured to output different samples in series.

FIG. 4G illustrates the active blocks of the decimation module 4510 when the clock phase adjustment submodule 4514 is enabled and the integer decimation submodule 4513 is disabled. In this example, the ADC 424 co-operates with the decimation module 4510 to output different respective sequences of samples with the required sampling rate. In this example, the ADC 424 may perform analog to digital conversion and also integer decimation. The clock phase adjustment submodule 4514 is coupled to the ADC 424 to control the ADC 424 to output different sequences of samples on different clock phases, and with the same sampling rate. If the decimation ratio is an integer, the RCF 4511 is bypassed, and the ADC 424 is controlled by the clock phase adjustment submodule 4514 to perform integer decimation function. If the decimation ratio is a fraction, the RFC 4511 is used to output the different sequences. A control signal (e.g., from the controller 433 of the receiver 400) controls the switch 4512 to pass output from the RCF 4511 or from the ADC 424 directly. The clock phase adjustment submodule 4514 may also be controlled by a control signal (e.g., from the controller 433) to select the clock phase for the ADC 424.

The ADC 424 is controlled by the clock phase adjustment submodule 4514 to adjust the clock phase for the analog to digital conversion. The result is that the combined analog signal is converted to digital sequences of samples having different start samples. For each clock phase, the sequence of samples is outputted in series. The number of the different sequences corresponds to the number of clock phases. In the implementation shown in FIG. 4G, selecting difference clock phases for the ADC 424 serves the same function as selecting different decimation phases. Clock phase adjustment is important because the clock edge should be selected at the right time (preferably close to the middle of the signal eye to make sure each sample is obtained close to or at the middle of the signal eye), in order to preserve orthogonality of the different encoded signals within the combined signal. Otherwise, noise or other interference may cause an incorrect sample.

Figure 4H:
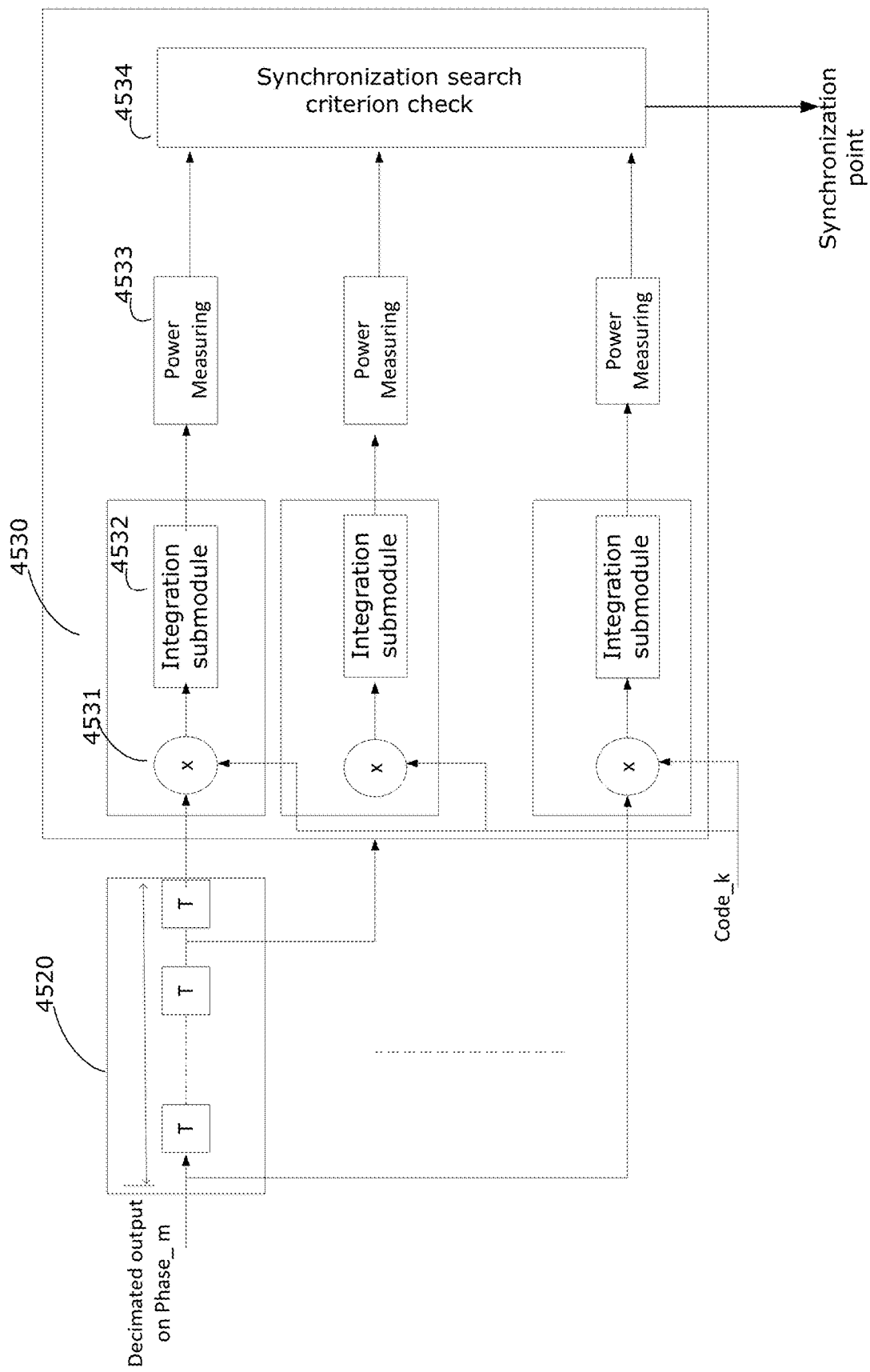
FIG. 4H is a schematic diagram of example time-shift and synchronization point detection modules for implementing the time-shift and synchronization point detection functions of FIG. 4C.

For each sequence of sample at a respective decimation phase, a plurality of time-shifted sequences is obtained. FIG. 4H illustrates an example of how the time-shift function 452 may be carried out for a sequence of samples at a given phase Phase_m. In this example, the time-shift function 452 is performed using a time-shift module 4520, which may use an N-bit shift register, for example. N time-shifted sequences at the given phase are outputted, corresponding to N different time delays. Each time delay is defined by Equation (2) below:

Time delay=$i \times T$; (2)

Where T is a time duration between two adjacent samples of the given sequence, or a fractional time duration between two adjacent samples of the given sequence, and T may be an integer or a fraction; and i is the number of time durations T that the sequence is delayed. i may be an integer from 0, 1, 2, 3 to N−1. In other examples such as in fractional delay scheme, i may be an integer or a fraction. In cases where the delay is fractional, a fractional delay filter may be used, for example, instead of a shift register. In accordance with Equation (2), the sequence of samples may be shifted using time delays 0, T, 2T, . . . , (N−1)×T to output N different time-shifted sequences of samples for the given phase Phase_m.

FIG. 4H also illustrates details of a synchronization point detection module 4530 that may be used to perform the synchronization point detection function 453 to determine a synchronization point. For simplicity, the synchronization point detection module 4530 is described with respect to the N candidate time-shifted sequences at the given decimation phase Phase_m. It should be understood that the synchronization point detection module 4530 may perform the synchronization point detection function 453 for all M×N candidate time-shifted sequences at all decimation phases, as described previously.

In this example, the synchronization point is determined for decoding a given encoded signal from the combined digital signal, using a given spreading code Code_k (where Code_k was used to generate the encoded signal originally). In some examples, the given spreading code Code_k that is selected for performing the synchronization search may be selected based on a determination of which spreading code best preserves orthogonality. In some cases, noise and/or interference may affect the orthogonality of different spreading codes on different channels. A determination may be made (e.g., during calibration or initial device setup) to identify which channel has the least impact on code orthogonality, and the given spreading code Code_k may be selected as the code that uses the identified channel.

In the example of FIG. 4H, for the given phase Phase_m, decoding attempts are made by multiplying the N time-shifted sequences, at multipliers 4531, by the given spreading code Code_k, thus obtaining N candidate results. The candidate results are integrated at an integration submodule 4532, and a power measurement is subsequently performed at a power measuring submodule 4533 to output the power measurement associated with each candidate result.

The power measurement for each candidate result is checked against a synchronization search criterion (e.g., maximum power or a power threshold) at the synchronization search criterion check 4534. Although FIG. 4H illustrates only one given phase Phase_m, the synchronization point detection module 4530 may process sequences over all M phases, with N time delays for each phase. Thus, the power measuring submodule 4533 and synchronization search criterion check 4534 may be performed for M×N candidate results, which are obtained by multiplying all of the M×N time-shifted sequences by the given spreading code Code_k. If the power measurement of a candidate result satisfies the synchronization search criterion, the synchronization point is defined to be the time delay and the phase corresponding to that candidate result. For example, if the time-shifted sequence corresponding to phase m and time delay n×T, when multiplied with Code_k, gives a candidate result associated with a power measurement that satisfies the synchronization search criterion, then the synchronization point is defined to be phase m and time delay n×T. The synchronization point detection module 4530 may process the M×N candidate time-shifted sequences in parallel or in series.

In some example embodiments, the synchronization search criterion may be a maximum power. That is, the candidate result associated with the maximum power is considered to best match with the given spreading code Code_k. The synchronization point detection module 4530 identifies the candidate result, from among the M×N candidate results, that is associated with the maximum power measurement. The synchronization point is determined based on the time delay and the decimation phase corresponding to the identified candidate result.

In other examples, the synchronization search criterion may be a predefined power threshold. That is, the candidate result associated with a measured power that is above a power threshold is considered to sufficiently match with the given spreading code Code_k. The synchronization point detection module 4530 identifies a candidate result, from among the M×N candidate results, which is associated with a power measurement above the predefined power threshold. The synchronization point is determined based on the time delay and the phase corresponding to the identified candidate result. The use of a predefined power threshold as the synchronization search criterion may be more appropriate where the synchronization point detection module 4530 processes the M×N time-shifted sequences in series.

After the synchronization point is determined, the decoder 430 uses the synchronization point to perform the decoder code synchronization 4430 to align the given spreading code for decoding one encoded signal from the combined digital signal. The decoder 430 may use the decimation phase defined by the synchronization point to perform the decimation function 451 on the combined digital signal, for example by controlling the integer decimation submodule 4513 accordingly. In examples where decimation is performed using the clock phase adjustment submodule 4514 to control the ADC 424, the clock phase adjustment submodule 4514 may control the ADC 424 to output the combined digital signal at the clock phase defined by the synchronization point. The time delay defined by the synchronization point is then applied to the decimated sequence of samples (e.g., by controlling output from the time-shift module 4520 accordingly). Finally, the decoder 430 can decode the decimated and time-shifted sequence at the decoding submodule 434, using the given spreading code.

Figure 4I:
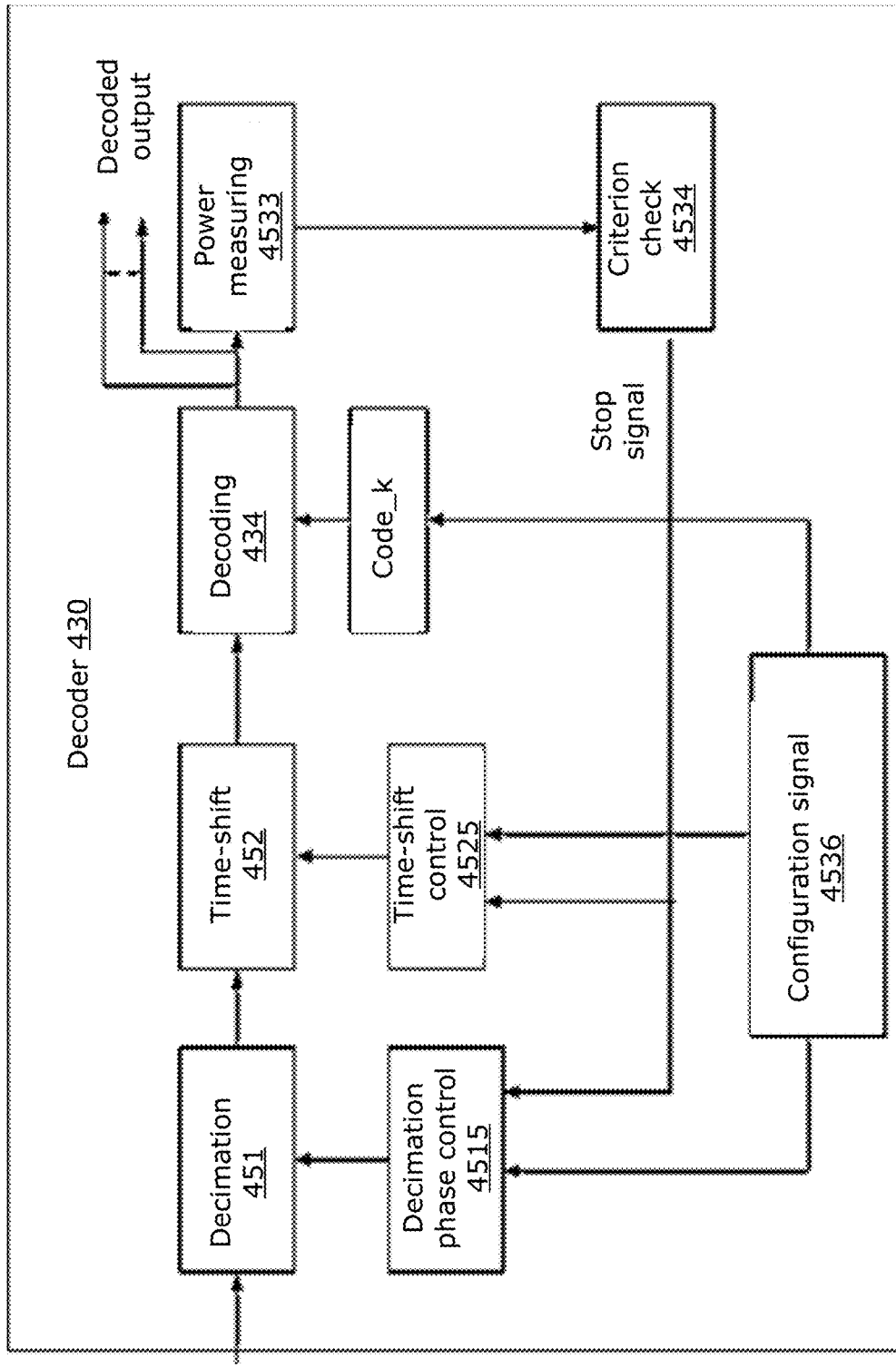
FIG. 4I is a block diagram summarizing an example implementation of a synchronization search.
Figure 5A:
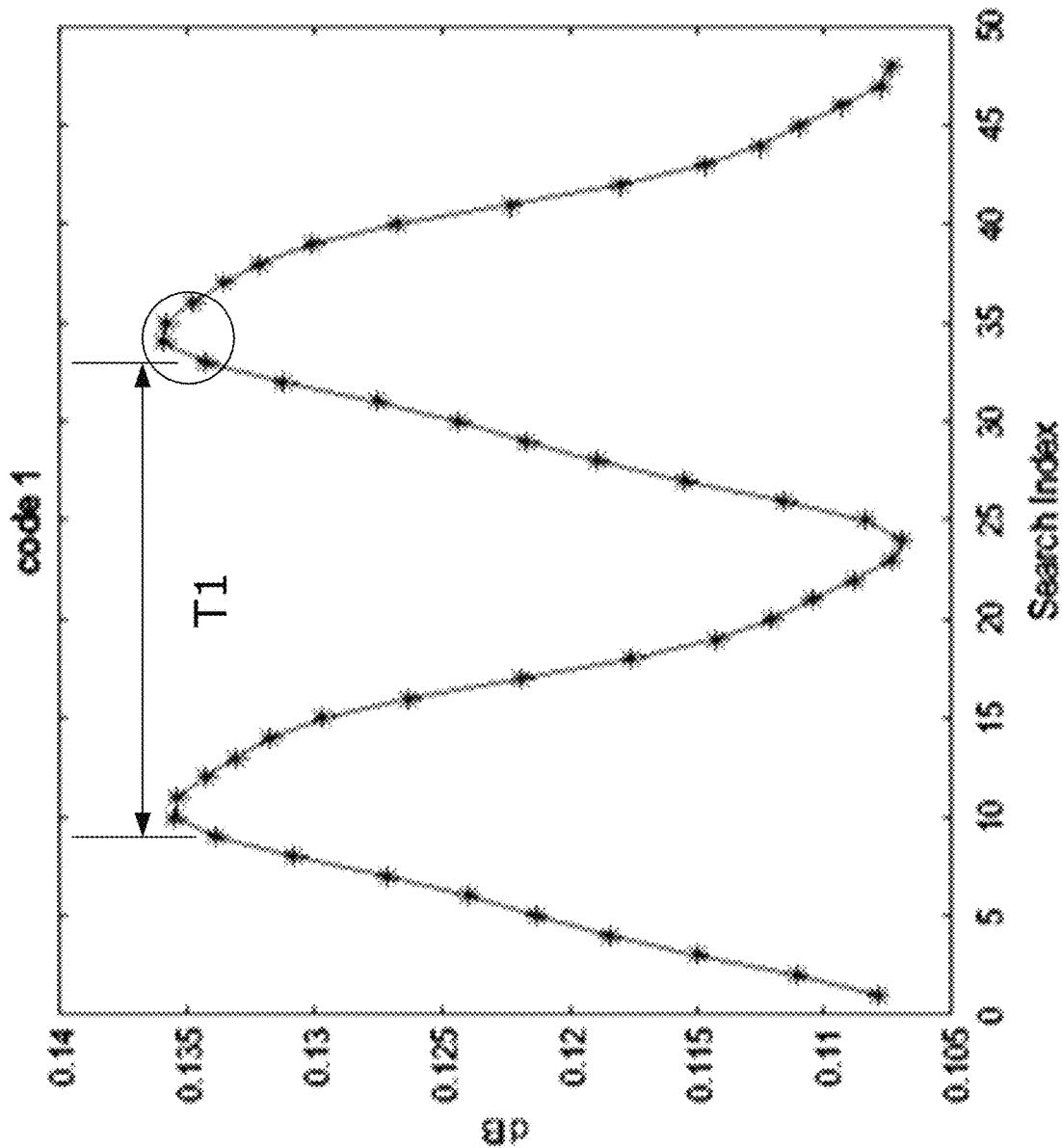
FIGS. 5A-5D are example plots of measured power results in synchronization searches using different spreading codes.
Figure 5B:
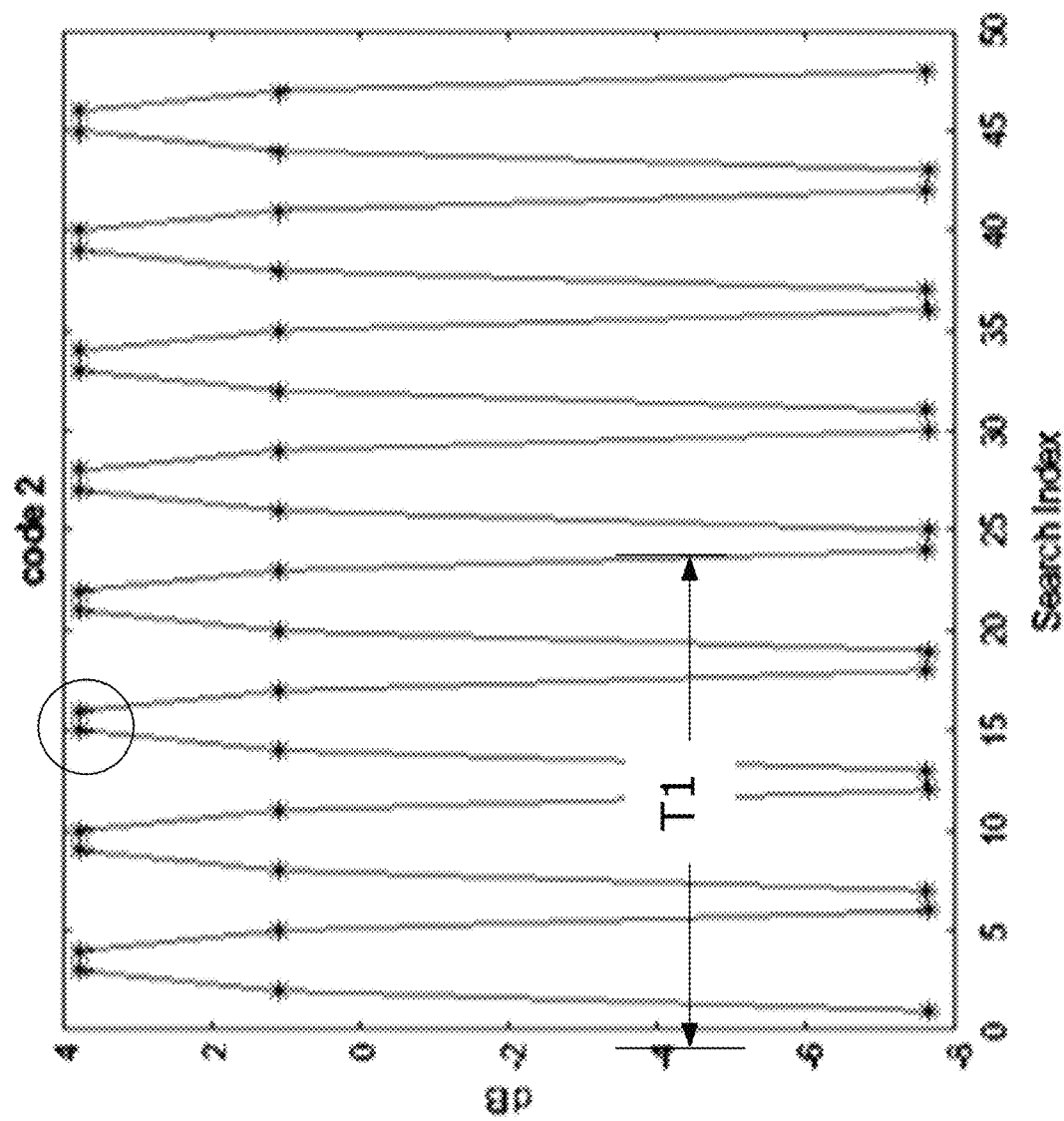
Figure 5C:
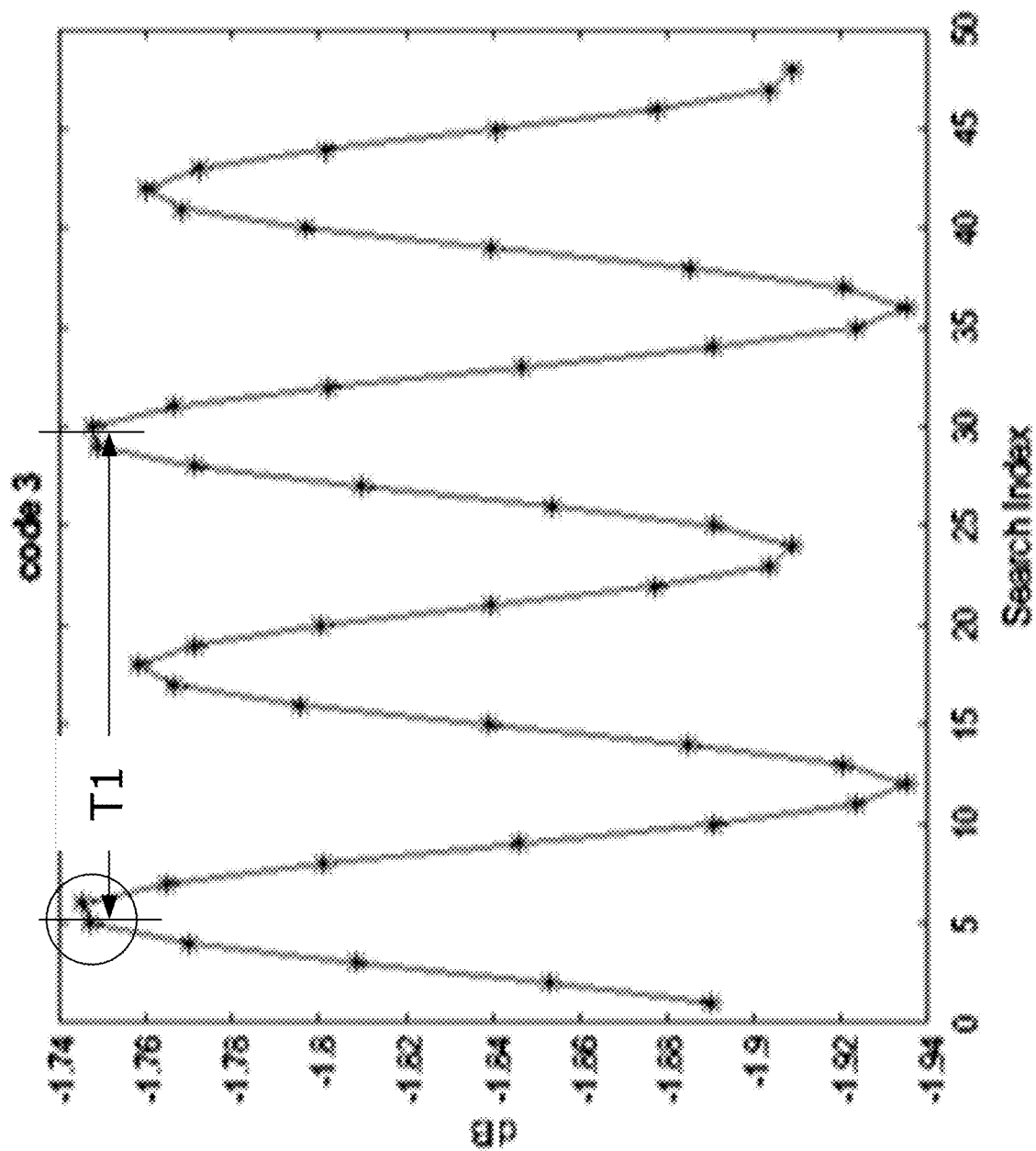
Figure 5D:
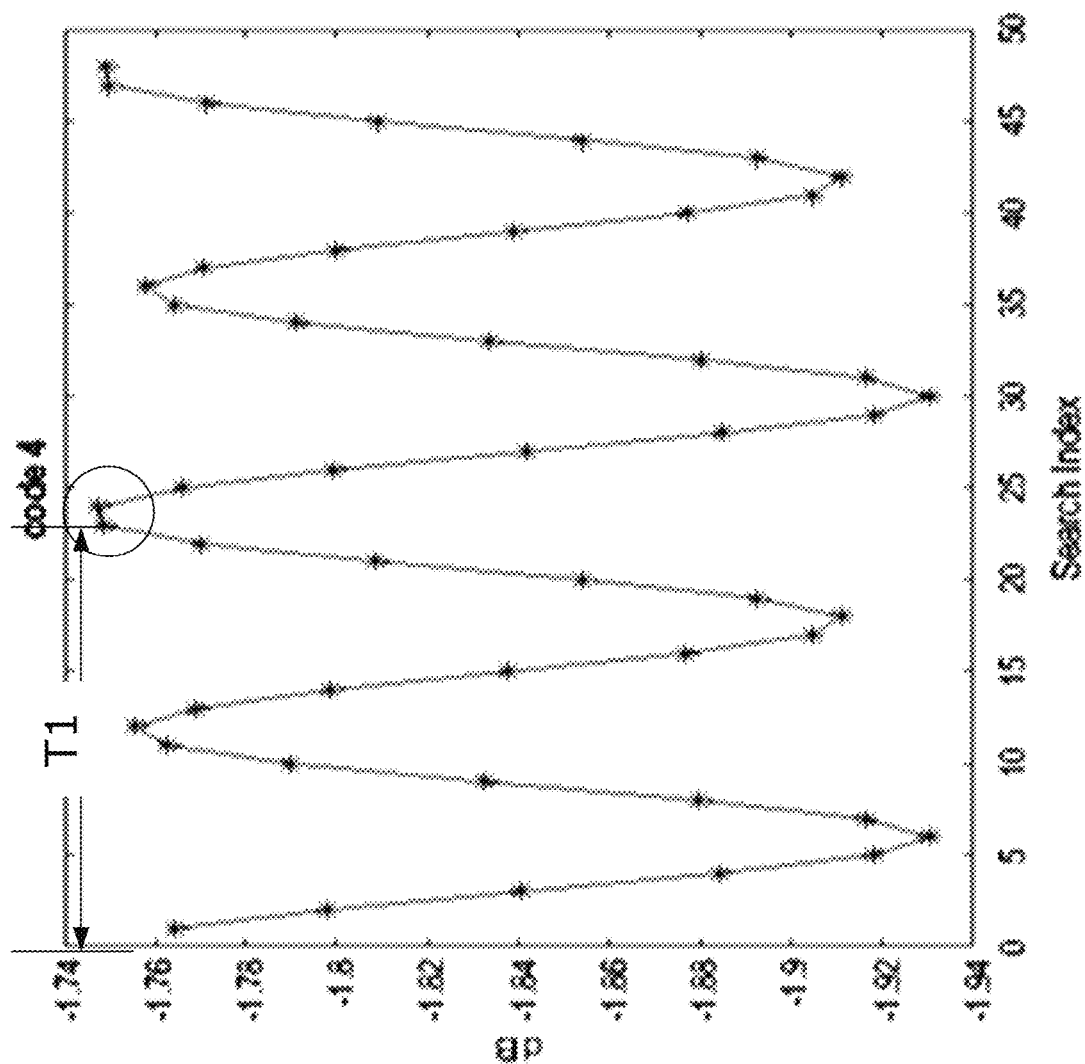

FIG. 4I is a block diagram that summarizes how the decoder 430 implements the synchronization search 450, in order to perform the decoder code synchronization 4430, as described above. As shown in FIG. 4I and discussed above, the synchronization search 450 may include searching for the decimation phase as well as searching for the time delay of the synchronization point. The synchronization search is based on evaluating the measured power (e.g., at the power measuring submodule 4533) of candidate results, after decoding is performed (e.g., using the decoding submodule 434) on candidates having different decimation phases and time-shifts. The candidate that satisfies a synchronization search criterion (e.g., as determined by the synchronization search criterion check 4534) is used to determine the synchronization point. When the synchronization search criterion is satisfied, the synchronization search criterion check 4534 sends a stop signal to stop the decimation phase search and the time delay search. Searching for the decimation phase is performed by controlling the decimation function 451 (e.g., using a decimation phase control module 4515) to perform decimation at a certain decimation phase. The decimation phase control module 4515 receives a configuration signal 4536 (which may be preset, for example at initialization; and which may be set by a processor external to the receiver 400) that sets the size of the phase search window. Searching for the time delay is performed by controlling the time-shift function 452 (e.g., using a time-shift control module 4525) to apply a certain time delay. The time-shift control module 4525 receives the configuration signal 4536 to set the size of the time-shift search window. The configuration signal 4536 may also set the code (denoted Code_k) to be used by the decoding submodule 434, for the synchronization search.

FIGS. 5A to 5D show example measured power results when a synchronization search is performed in an analog spreading system. In FIGS. 5A to 5D, the search index is an index of the different time delays for different decimation phases. As shown in FIGS. 5A to 5D, measured power results using four different spreading codes (code 1 to code 4 having same code length) show that power peaks (circled) can be determined within a spreading code period T1. Within a spreading code period T1, each power peak corresponds to a result that best aligns with the spreading code, and thus corresponds to a synchronization point. In some examples, a synchronization point determined by one synchronization search using a given spreading code may overlap with synchronization points determined in a synchronization search using a different spreading code. For example, it can be seen that the measured power results for code 1 (shown in FIG. 5A), code 2 (shown in FIG. 5B) and code 4 (shown in FIG. 5D) all exhibit power peaks at search index 10, within the spreading code period T1. Therefore, a synchronization point can be determined within a spreading code period in the analog domain, and a synchronization point found using one spreading code may be used for synchronizing another spreading code.

It will be appreciated that one or more functions/modules discussed above may be implemented using basic electronic components. For example, the BPFs 406, 412 and/or the LPFs 418(a), 418 (b), 4324 may be resistor-inductor-capacitor (RLC) circuits. The LNA 408, the down-converter 410, the AMP 414, the I/Q encoder 416, the combiners 420, 421, the ADCs 424, 426, PN code generator 4322, the complex modulator 4326, and/or the decimation module 4510 may be implemented using any suitable transistors or integrated circuits. It will also be appreciated that the various synchronizations, such as the encoder code synchronization, decoder code synchronization and decoder input synchronization, as disclosed above, may be implemented by hardware components, software or combination thereof. For example, the spreading code generator 4322 (which may be implemented using hardware such as an application-specific integrated circuit (ASIC) or a field-programmable gate array (FPGA)) may receive external software instructions (such as from the controller 433) or internal software instruction to perform the encoder code synchronization.

It should be understood that aspects of the present disclosure may be implemented as an apparatus that includes the decoder 430 as described above, and that may also include the encoder 416 and/or spreading code source 4322. The apparatus may be in general any receiver including the decoder 430 as described above, and may have other components different from those described above with reference to FIG. 4A. For example, components on the Rx path 402, such as the BPF 406, LNA 408 and/or BPFs 412, may be varied or omitted.

Figure 6:
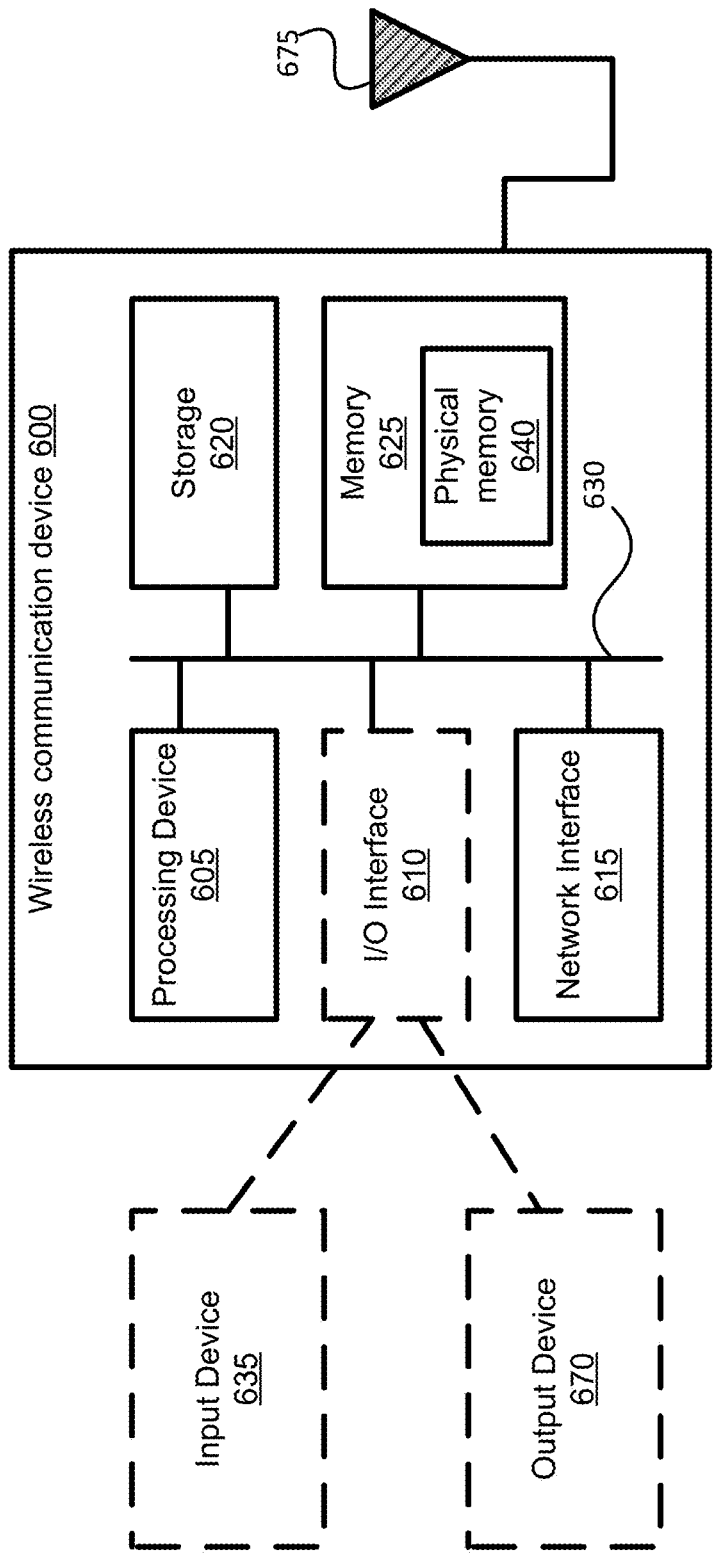
FIG. 6 is a schematic representation of an example wireless communication device which may include the example receiver of FIG. 4A.

FIG. 6 is a schematic diagram of an example wireless communication device 600, which may be used to implement various aspects of the present disclosure. For example, the wireless communication device 600 may be an electronic device, such as a user equipment (UE) or a base station, and may include a receiver 400 as disclosed above. The wireless communication device 600 may be used for communications within 5G communication networks. Other communication devices (including communication devices for wired or wireless communications) suitable for implementing examples described in the present disclosure may be used, which may include components different from those discussed below. Although FIG. 6 shows a single instance of each component, there may be multiple instances of each component in the wireless communication device 600 and the wireless communication device 600 could be implemented using parallel and/or distributed architecture.

The wireless communication device 600 may include one or more processing devices 605, such as a processor, a microprocessor, an application-specific integrated circuit (ASIC), a field-programmable gate array (FPGA), a dedicated logic circuitry, or combinations thereof. The wireless communication device 600 may also include one or more optional input/output (I/O) interfaces 610, which may enable interfacing with one or more optional input devices 635 and/or output devices 670. The wireless communication device 600 may include one or more network interfaces 615 for wired or wireless communication with a network (e.g., an intranet, the Internet, a P2P network, a WAN and/or a LAN, and/or a Radio Access Network (RAN)) or other node. The network interface(s) 615 may include one or more interfaces to wired networks and wireless networks. Wired networks may make use of wired links (e.g., Ethernet cable). Wireless networks, where they are used, may make use of wireless connections transmitted over an antenna 675. The network interface(s) 615 may provide wireless communication via one or more transmitters or transmit antennas and one or more receivers or receive antennas, for example. In this example, one antenna 675 is shown, which may serve for both transmitter and receiver. However, in other examples there may be multiple antennas for transmitting and receiving. In some examples, an antenna array may be used. The wireless communication device 600 may also include one or more storage units 620, which may include a mass storage unit such as a solid state drive, a hard disk drive, a magnetic disk drive and/or an optical disk drive.

The wireless communication device 600 may include one or more memories 625 that can include physical memory 640, which may include a volatile or non-volatile memory (e.g., a flash memory, a random access memory (RAM), and/or a read-only memory (ROM)). The non-transitory memory(ies) 625 (as well as storage 620) may store instructions for execution by the processing device(s) 605, such as to carry out processing such as those described in the present disclosure. The memory(ies) 625 may include other software instructions, such as for implementing an operating system (OS), and other applications/functions. In some examples, one or more data sets and/or modules may be provided by an external memory (e.g., an external drive in wired or wireless communication with the wireless communication device 600) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 630 providing communication among components of the wireless communication device 600. The bus 630 may be any suitable bus architecture including, for example, a memory bus, a peripheral bus or a video bus. Optional input device(s) 635 (e.g., a keyboard, a mouse, a microphone, a touchscreen, and/or a keypad) and optional output device(s) 670 (e.g., a display, a speaker and/or a printer) are shown as external to the wireless communication device 600, and connected to optional I/O interface 610. In other examples, one or more of the input device(s) 635 and/or the output device(s) 670 may be included as a component of the wireless communication device 600.

The apparatus or receiver 400 described above may be included as a component of the wireless communication device 600, for example as a component for receiving RF analog signals using multiple antennas 675. The processing device(s) 605 may also be used to control operation of the receiver 400. For example, one or more functions of the controller 433 described above may be performed by the processing device(s) 605. In some example embodiments, one or more aspects of the synchronization search, such as the time-shift function 452 and/or the synchronization point detection function 453 may be performed by the processing device(s) 605.

FIG. 7 illustrates an example method 700 that may be implemented in the disclosed receiver 400.

The method 700 includes, optionally, at 702, performing a encoder code synchronization to compensate for any time difference among the spreading codes that are used for encoding on the receiving paths. The encoder code synchronization may be performed, as described above, by the spreading code source 4322. Performing the encoder code synchronization helps to eliminate or reduce any time differences among the plurality of spreading codes arriving at the encoders 416, for example time differences caused by differences in path delays on the code transmitting paths.

Optionally, at 704, a decoder input synchronization may be performed to compensate for any time difference between I and Q combined digital signals arriving at the decoder 430. The decoder input synchronization may be performed, as described above, by the decoder 430, where the I and Q combined digital signals are transmitted on separate I and Q signal paths. Performing the decoder input synchronization helps to eliminate or reduce any time difference caused by a difference in path delays between the I and Q signal paths.

At 706, a given spreading code-encoded signal is decoded. The decoding includes aligning a spreading code, using a decoder code synchronization, and decoding the given spreading code-encoded signal using the aligned spreading code. 706 may be performed by the decoder 430 of the receiver 400.

At 707, a synchronization search is performed to determine the synchronization point for aligning the spreading code. The synchronization search may be performed as described above, and may include searching for a time delay and a decimation phase for the synchronization point. The synchronization search, as described above, includes obtaining a plurality of candidate results, where each candidate result is a decoding attempt that applies at least a respective time delay for aligning the spreading code with the given spreading code-encoded signal. The synchronization point is found by identifying the time delay (and also the decimation phase, where appropriate) corresponding to the candidate result that is associated with a power measurement that satisfies a synchronization search criterion.

In some examples, the synchronization search may be performed for decoding each spreading code-encoded signal. In other examples, the synchronization point resulting from the synchronization search performed for decoding one spreading code-encoded signal may be used for decoding another spreading code-encoded signal, such that the synchronization search is not performed for decoding each spreading code-encoded signal.

At 708, a decoder code synchronization is performed to align a starting time reference of the spreading code with a starting time reference of the combined digital signal. The spreading code that is aligned using the decoder code synchronization is the spreading code that was used to generate the given spreading code-encoded signal. Performing the decoder code synchronization may include applying a time delay, as defined by the synchronization point, to the spreading code. Performing the decoder code synchronization may also include selecting a decimation phase, as defined by the synchronization point, for decimating the combined digital signal.

At step 710, the given spreading code-encoded analog signal is decoded from the combined digital signal using the aligned spreading code.

Step 706 may be repeated for decoding each spreading code-encoded signal from the combined digital signal (with step 707 being optional for decoding of subsequent spreading code-encoded signals), until all the spreading code-encoded signals have been decoded.

Although the encoder code synchronization, decoder code synchronization and decoder input synchronization are shown as part of an overall method 700, it should be understood that each synchronization may be performed independently of each other synchronization. For example, 706, which includes the decoder code synchronization, may be performed independently from and in the absence of the encoder code synchronization and decoder input synchronization.

In the present disclosure, example apparatus and receiver are described. By performing various synchronizations, the example apparatus and receiver are able to recover the data from received analog signals without significant distortion. The example disclosed apparatus and receiver perform a synchronization in the decoder to align the spreading code for decoding, and may perform a synchronization search to determine the synchronization point for aligning the spreading code. The synchronization search performed by the disclosed apparatus and receiver may enable accurate synchronization for received analog signals, unlike conventional cross-correlation techniques that are more suited for digital signals.

The example disclosed apparatus and receiver may be used in any suitable wireless or wired communication device, such as UEs and base stations, for example in an analog spread spectrum system.

In various examples, the example disclosed apparatus and receiver may support multiple spectrum band access for multiple-input multiple-output (MIMO) communications in the analog domain.

The synchronizations described herein may be implemented on real-time, actual data traffic, without the need for self-generated reference training signals. Static synchronizations (e.g., the encoder code synchronization and decoder input synchronization) may be set up during calibration or initial device setup period, rather than during the downlink (DL) period on time division duplex (TDD). This may help to support frequency division duplex (FDD) and TDD transmissions.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. An apparatus for decoding a spreading code-encoded signal, the apparatus comprising:
a decoder configured to receive a spreading code-encoded signal, the received spreading code-encoded signal being received in a combined signal combining a plurality of spreading code-encoded signals;
a plurality of spreading code-encoders, each spreading code-encoder being configured to encode a respective analog signal using a respective spreading code and to output a respective spreading code-encoded signal; and
a spreading code source configured to provide respective spreading codes to the plurality of spreading code-encoders via respective code transmitting paths, the spreading code source being further configured to perform an encoder code synchronization to compensate for any time difference among the respective spreading codes caused by path delays among the code transmitting paths;
the decoder being further configured to decode the received spreading code-encoded signal by:
performing a synchronization search to determine a synchronization point, the synchronization point defining at least a time delay for aligning a starting time reference of the respective spreading code, which was used to generate the received spreading code-encoded signal, with a starting time reference of the received spreading code-encoded signal;
the synchronization search being performed by:
determining a plurality of candidate results, each candidate result being a decoding attempt that applies a respective time delay for aligning the respective spreading code with the received spreading code-encoded signal; and
determining the synchronization point by identifying at least the time delay corresponding to the candidate result that is associated with a power measurement that satisfies a synchronization search criterion;
performing a decoder code synchronization to align the starting time reference of the respective spreading code with the starting time reference of the received spreading code-encoded signal, using the synchronization point; and
decoding the received spreading code-encoded signal using the aligned spreading code.

2. The apparatus of claim 1, wherein the spreading code source is further configured to perform the encoder code synchronization by:
performing a time delay adjustment to reduce any time difference among the respective spreading codes; and
performing a code phase adjustment to align phases of the respective spreading codes with respect to each other.

3. The apparatus of claim 1, wherein the received spreading code-encoded signal is received in a combined signal combining a plurality of spreading code-encoded signals, and wherein the decoder is further configured to:
perform a first decoding, including performing the synchronization search to determine the synchronization point, to decode a first spreading code-encoded signal from the combined signal, using a first spreading code; and
perform a second decoding, without performing the synchronization search, for decoding a second spreading code-encoded signal from the combined signal, using a second spreading code, the second decoding using the synchronization point determined in the first decoding.

4. The apparatus of claim 1, wherein the spreading code-encoded signal is a digital signal generated by an analog-to-digital converter (ADC), wherein the decoder is further configured to decimate the digital signal and to output sequences of samples at different respective decimation phases, and wherein the synchronization point further defines a decimation phase to be used for decimating the digital signal.

5. The apparatus of claim 4, wherein the decoder is further configured to control a clock phase used by the ADC, to cause the ADC to output the sequences of samples at the different respective decimation phases.

6. The apparatus of claim 4, wherein the plurality of candidate results includes, for each decimation phase, a respective plurality of time-shifted sequences, the plurality of candidate results being obtained by:
for a sequence of samples at a first decimation phase, shifting the sequence of samples using different time delays to output a plurality of time-shifted sequences for the first decimation phase, each time-shifted sequence having been shifted by a different time delay;
for the first decimation phase, multiplying the respective plurality of time-shifted sequences using the respective spreading code to obtain a plurality of candidate results corresponding to different time delays and the first decimation phase;
repeating the multiplying for each other decimation phase to obtain the plurality of candidate results corresponding to different time delays and different decimation phases; and
wherein the synchronization point is determined by:
obtaining a power measurement of each candidate result after integration; and
identifying the candidate result that is associated with the power measurement that satisfies the synchronization search criterion;

wherein the synchronization point is defined to be the time delay and decimation phase corresponding to the identified candidate result.

7. The apparatus of claim 6, wherein the synchronization search criterion is a maximum power, and the candidate result that is associated with a maximum power measurement is used to determine the synchronization point.

8. The apparatus of claim 6, wherein the synchronization search criterion is a predefined power threshold, and the candidate result that is associated with a power measurement above the predefined power threshold is used to determine the synchronization point.

9. The apparatus of claim 6, wherein the decoder is further configured to perform the decoder code synchronization by:
 decimating the digital signal and outputting a sequence of samples at the decimation phase defined by the synchronization point; and
 shifting the sequence of samples using the time delay defined by the synchronization point.

10. A receiver comprising:
 a plurality of receiving paths, each receiving path being configured to receive a respective analog signal;
 a plurality of spreading code-encoders, each spreading code-encoder being configured to encode a respective received analog signal on a respective receiving path using a respective spreading code and to output a respective spreading code-encoded analog signal;
 a spreading code source configured to provide the respective spreading codes to the plurality of spreading code-encoders via respective code transmitting paths, the spreading code source being further configured to perform an encoder code synchronization to compensate for any time difference among the spreading codes caused by path delays among the code transmitting paths;
 at least one combiner, the combiner being configured to combine the respective spreading code-encoded analog signals and to output a combined analog signal;
 at least one analog to digital converter (ADC) configured to convert the combined analog signal to a combined digital signal; and
 a decoder configured to decode the combined digital signal and output decoded signals corresponding to the received analog signals;
 the decoder being configured to, for decoding a first spreading code-encoded signal from the combined digital signal:
 perform at least one synchronization search to determine a synchronization point for performing a decoder code synchronization, the synchronization point defining at least a time delay for aligning a starting time reference of a first spreading code, which was used to generate the first spreading code-encoded signal, with a starting time reference of the combined digital signal;
 the synchronization search being performed by:
  obtaining a plurality of candidate results, each candidate result being a decoding attempt that applies at least a respective time delay for aligning the first spreading code with the first spreading code-encoded signal; and
  determining the synchronization point by identifying at least the time delay corresponding to the candidate result that is associated with a power measurement that satisfies a synchronization search criterion;
 perform the decoder code synchronization to align the starting time reference of the first spreading code, using the synchronization point, with the starting time reference of the combined digital signal; and
 decode the first spreading code-encoded signal using the aligned spreading code.

11. The receiver of claim 10, wherein the decoder is further configured to:
 perform a first decoding, including performing the synchronization search to determine the synchronization point, for decoding the first spreading code-encoded signal using the first spreading code; and
 perform a second decoding, without performing the synchronization search, for decoding a second spreading code-encoded signal using a second spreading code, the second decoding using the synchronization point determined in the first decoding.

12. The receiver of claim 10, wherein each spreading code-encoder is an in-phase and quadrature-phase (I/Q) encoder, and wherein the I/Q encoder is configured to encode an in-phase (I) component of the respective received analog signal and a quadrature-phase (Q) component of the respective received analog signal, to output an encoded I analog signal and an encoded Q analog signal;
 wherein the at least one combiner includes:
  an I combiner for combining the encoded I analog signals and output an I combined analog signal; and
  a Q combiner for combining the encoded Q analog signals and output a Q combined analog signal; and
 wherein the receiver includes at least two ADCs, each ADC being configured to convert a respective one of the I combined analog signal and the Q combined analog signal and to output a respective one of an I combined digital signal and a Q combined digital signal on respective signal paths.

13. The receiver of claim 12, wherein the decoder is further configured to perform a decoder input synchronization by:
 performing a time delay adjustment to compensate for any time difference between the I combined digital signal and the Q combined digital signal caused by path delays on the respective signal paths.

14. A method for decoding a spreading code-encoded signal, the method comprising:
 receiving a spreading code-encoded signal, the received spreading code-encoded signal being received in a combined signal combining a plurality of spreading code-encoded signals;
 encoding a respective analog signal using a respective spreading code to output a respective spreading code-encoded signal;
 prior to encoding the respective analog signals, performing an encoder code synchronization to compensate for any time difference among the respective spreading codes used for encoding;
 decoding the received spreading code-encoded signal by:
 performing a synchronization search to determine a synchronization point, the synchronization point defining at least a time delay for aligning a starting time reference of the respective spreading code, which was used to generate the received spreading code-encoded signal, with a starting time reference of the received spreading code-encoded signal;
 the synchronization search being performed by:
  obtaining a plurality of candidate results, each candidate result being a decoding attempt that applies at least a respective time delay for aligning the respective spreading code with the received spreading code-encoded signal; and determining the synchronization point by identifying at least the time delay corresponding to the candidate result that is associated with a power measurement that satisfies a synchronization search criterion;

performing a decoder code synchronization to align the starting time reference of the respective spreading code with the starting time reference of the received spreading code-encoded signal, using the synchronization point; and decoding the received spreading code-encoded signal using the aligned spreading code.

15. The method of claim 14, wherein the received spreading code-encoded signal is received in a combined signal combining a plurality of spreading code-encoded signals, the method further comprising:

performing a first decoding, including performing the synchronization search to determine the synchronization point, to decode the received spreading code-encoded signal from the combined signal, using a first spreading code; and performing a second decoding, without performing the synchronization search, to decode a second spreading code-encoded signal from the combined signal, using a second spreading code, the second decoding using the synchronization point determined in the first decoding.

16. The method of claim 14, wherein the spreading code-encoded signal is a digital signal generated by an analog-to-digital converter (ADC), the method further comprising:

decimating the digital signal to output sequences of samples at different respective decimation phases, and wherein the synchronization point further defines a decimation phase to be used for decimating the digital signal.

17. The method of claim 16, wherein the plurality of candidate results includes, for each decimation phase, a respective plurality of time-shifted sequences, the plurality of candidate results being obtained by:

for each decimation phase:

for a sequence of samples at a first decimation phase, shifting the sequence of samples using different time delays to output a plurality of time-shifted sequences for the first decimation phase, each time-shifted sequence having been shifted by a different time delay; and for the first decimation phase, multiplying the respective plurality of time-shifted sequences using the respective spreading code to obtain a plurality of candidate results corresponding to different time delays and the first decimation phase;

repeating the multiplying for each other decimation phase to obtain a plurality of candidate results corresponding to different time delays and different decimation phases; and wherein the synchronization point is determined by:

obtaining a power measurement of each candidate result after integration; and identifying the candidate result that is associated with the power measurement that satisfies the synchronization search criterion;

wherein the synchronization point is defined to be the time delay and decimation phase corresponding to the identified candidate result.

18. The method of claim 17, wherein the synchronization search criterion is a maximum power, and the candidate result that is associated with a maximum power measurement is used to determine the synchronization point.

19. The method of claim 17, wherein the synchronization search criterion is a predefined power threshold, and the candidate result that is associated with a power measurement above the predefined power threshold is used to determine the synchronization point.

20. The method of claim 17, wherein performing the decoder code synchronization comprises:

decimating the digital signal and outputting a sequence of samples at the decimation phase defined by the synchronization point; and shifting the sequence of samples using the time delay defined by the synchronization point.

\* \* \* \* \*